US 8,533,311 B2

(12) United States Patent
Chiu et al.

(10) Patent No.: US 8,533,311 B2
(45) Date of Patent: Sep. 10, 2013

(54) SYSTEM AND METHOD FOR REMOTELY CONTROLLING MOBILE COMMUNICATION DEVICES

(75) Inventors: Denny K. Chiu, Milton (CA); James A. Godfrey, Waterloo (CA); Wen Gao, Waterloo (CA)

(73) Assignee: Research In Motion Limited, Waterloo (CA)

( * ) Notice: Subject to any disclaimer, the term of this patent is extended or adjusted under 35 U.S.C. 154(b) by 369 days.

(21) Appl. No.: 12/835,340

(22) Filed: Jul. 13, 2010

(65) Prior Publication Data

US 2010/0281153 A1 Nov. 4, 2010

Related U.S. Application Data

(63) Continuation of application No. 10/282,289, filed on Oct. 28, 2002, now Pat. No. 7,870,228.

(60) Provisional application No. 60/330,652, filed on Oct. 26, 2001.

(51) Int. Cl.
*G06F 15/173* (2006.01)
*G06F 15/16* (2006.01)

(52) U.S. Cl.
USPC ............................ 709/223; 709/206; 709/207

(58) Field of Classification Search
USPC ................ 709/210, 213, 217, 219, 225, 226, 709/229, 201–207, 223; 455/410, 411, 456.1
See application file for complete search history.

(56) References Cited

U.S. PATENT DOCUMENTS

| | | | |
|---|---|---|---|
| 5,577,100 A | 11/1996 | McGregor et al. | |
| 5,734,978 A * | 3/1998 | Hayatake et al. | 455/410 |
| 6,012,100 A * | 1/2000 | Frailong et al. | 709/250 |
| 6,021,433 A | 2/2000 | Payne et al. | |
| 6,044,265 A | 3/2000 | Roach, Jr. | |
| 6,198,915 B1 | 3/2001 | McGregor et al. | |
| 6,199,099 B1 | 3/2001 | Gershman et al. | |
| 6,208,204 B1 * | 3/2001 | Suzuki et al. | 330/52 |
| 6,219,694 B1 | 4/2001 | Lazaridis et al. | |
| 6,244,758 B1 * | 6/2001 | Solymar et al. | 709/224 |

(Continued)

FOREIGN PATENT DOCUMENTS

| | | |
|---|---|---|
| CA | 2211892 | 8/1996 |
| EP | 1113678 | 7/2001 |

OTHER PUBLICATIONS

CIPO: Office Action issued Nov. 3, 2009 for Application No. 2410114 (4 pages).

*Primary Examiner* — Sargon Nano
(74) *Attorney, Agent, or Firm* — Jones Day

(57) ABSTRACT

A system for remotely controlling mobile communication devices includes a redirection system, a remote control system and a mobile data communication device. The redirection system detects a triggering event at a host system and in response to the triggering event continuously redirects data items from the host system to a wireless network. The mobile data communication device receives data items from the wireless network and executes a plurality of device operations. The remote control system receives control information from a user interface and transmits the control information through the redirection system to the wireless network. The control information is received and executed by the mobile data communication device to remotely control one or more of the device operations. Methods of controlling the operation of mobile data communication devices are also disclosed.

8 Claims, 13 Drawing Sheets

(56) References Cited

U.S. PATENT DOCUMENTS

| | | |
|---|---|---|
| 6,269,392 B1 * | 7/2001 | Cotichini et al. ............. 709/200 |
| 6,300,863 B1 * | 10/2001 | Cotichini et al. ............. 340/5.8 |
| 6,333,684 B1 | 12/2001 | Kang |
| 6,418,533 B2 | 7/2002 | Angelo et al. |
| 6,424,996 B1 | 7/2002 | Killcommons et al. |
| 6,446,118 B1 | 9/2002 | Gottlieb |
| 6,449,305 B1 | 9/2002 | Menich et al. |
| 6,493,548 B1 * | 12/2002 | Kinoshita ................. 455/412.1 |
| 6,542,729 B1 | 4/2003 | Chmaytelli et al. |
| 6,549,776 B1 * | 4/2003 | Joong ........................ 455/433 |
| 6,557,029 B2 * | 4/2003 | Szymansky ................. 709/206 |
| 6,594,682 B2 | 7/2003 | Peterson et al. |
| 6,615,095 B1 * | 9/2003 | Kono et al. ................... 700/108 |
| 6,633,759 B1 | 10/2003 | Kobayashi |
| 6,662,023 B1 | 12/2003 | Helle |
| 6,691,162 B1 | 2/2004 | Wick |
| 6,757,713 B1 * | 6/2004 | Ogilvie et al. ................ 709/206 |
| 6,771,954 B1 | 8/2004 | Yoneyama et al. |
| 6,779,019 B1 | 8/2004 | Mousseau et al. |
| 6,804,699 B1 * | 10/2004 | Henrie ........................ 709/203 |
| 6,813,487 B1 | 11/2004 | Trommelen |
| 6,813,498 B1 | 11/2004 | Durga et al. |
| 6,834,306 B1 | 12/2004 | Tsimelzon |
| 6,970,917 B1 * | 11/2005 | Kushwaha et al. ........... 709/217 |
| 6,993,666 B1 | 1/2006 | Hokkanen et al. |
| 6,999,993 B1 | 2/2006 | Shah et al. |
| 7,065,347 B1 | 6/2006 | Vikse et al. |
| 7,099,699 B2 | 8/2006 | Jeong |
| 7,127,213 B2 * | 10/2006 | Haymes et al. ............ 455/67.11 |
| 7,150,017 B1 | 12/2006 | Vogl et al. |
| 7,200,220 B1 | 4/2007 | Yamao |
| 7,584,149 B1 * | 9/2009 | Bishop et al. .................... 705/51 |
| 7,801,959 B1 * | 9/2010 | Lennie et al. ................. 709/206 |
| 8,055,776 B1 * | 11/2011 | Dutta ............................ 709/227 |
| 2001/0000777 A1 | 5/2001 | McGregor et al. |
| 2001/0004591 A1 * | 6/2001 | Jeong ............................ 455/419 |
| 2001/0013127 A1 | 8/2001 | Tomita et al. |
| 2001/0027478 A1 | 10/2001 | Meier et al. |
| 2001/0029178 A1 * | 10/2001 | Criss et al. .................... 455/419 |
| 2002/0002627 A1 | 1/2002 | Stead et al. ................... 709/250 |
| 2002/0045437 A1 * | 4/2002 | Kesler .......................... 455/411 |
| 2002/0103622 A1 * | 8/2002 | Burge .......................... 702/183 |
| 2002/0174184 A1 * | 11/2002 | Bouchard .................... 709/206 |
| 2003/0055902 A1 * | 3/2003 | Amir et al. ................... 709/206 |
| 2003/0069991 A1 * | 4/2003 | Brescia ........................ 709/245 |
| 2003/0093565 A1 * | 5/2003 | Berger et al. ................. 709/246 |
| 2004/0023695 A1 | 2/2004 | Zechlin |
| 2004/0087338 A1 * | 5/2004 | Natsuno ....................... 455/558 |

* cited by examiner

SYSTEM AND METHOD FOR REMOTELY CONTROLLING MOBILE COMMUNICATION DEVICES

CROSS-REFERENCE TO RELATED APPLICATION

This is a continuation of U.S. patent application Ser. No. 10/282,289, filed Oct. 28, 2002, which claims benefit of U.S. Provisional Application No. 60/330,652, filed Oct. 26, 2001, both applications hereby incorporated herein by reference.

FIELD OF THE INVENTION

The present invention is directed toward the field of mobile communications. In particular, the system and method of the present invention provide for remote control of mobile communication devices. The hand-held mobile communication devices may be associated with an event-driven redirection computer program ("redirector program") operating at a host system, which, upon sensing a particular user-defined event has occurred, redirects user-selected data items from the host system to the user's mobile communication device. The mobile data communication device may be coupled to the host system via a wireless network and one or more landline networks.

BACKGROUND

Known systems and methods for replicating information from a host system to a user's mobile data communication device are typically "synchronization" systems in which the user's data items are warehoused (or stored) at the host system for an indefinite period of time and then transmitted in bulk only in response to a user request. In these types of systems and methods, when replication of the warehoused data items to the mobile device is desired, the user typically places the mobile device in an interface cradle that is electrically connected to the host system via some form of local, dedicated communication, such as a serial cable or an infrared or other type of wireless link. Software executing on the mobile data communication device then transmits commands via the local communications link to the host system to cause the host to begin transmitting the user's data items for storage in a memory bank of the mobile device. In these synchronization schemes, the mobile unit "pulls" the warehoused information from the host system in a batch each time the user desires to replicate information between the two devices. Therefore, the two systems (host system and device) only maintain the same data items after a user-initiated command sequence that causes the mobile device to download the data items from the host system.

A general problem with these synchronization systems is that the only time that the user data items are replicated between the host system and the mobile data communication device is when the user commands the mobile device to download or pull the user data from the host system. At some later time a new message could be sent to the user, but the user would not receive that message until the next time the user fetches the user data items. Thus, a user may fail to respond to an emergency update or message because the user only periodically synchronizes the system, such as once per day. Other problems with these systems include: (1) the amount of data to be reconciled between the host and the mobile device can become large if the user does not "synchronize" on a daily or hourly basis, leading to bandwidth difficulties, particularly when the mobile device is communicating via a wireless packet-switched network; and (2) reconciling large amounts of data, as can accrue in these batch-mode synchronization systems, can require a great deal of communication between the host and the mobile device, thus leading to a more complex, costly and energy-inefficient system.

In order to address such disadvantages of pull-based data item synchronization systems, the assignee of the instant application has developed a more automated, continuous, efficient and reliable system and method of ensuring that user data items are replicated at a user's mobile communication device. User-selected data items or certain portions of the selected data items stored at a host system are continuously redirected or "pushed" to a user's mobile data communication device upon the occurrence of a user-defined triggering event.

In such a system, a user's mobile communication device is configured for redirection service provided by the host system, as well as for mobile communication services provided by a communication network operator. Although a user may perceive such device services as a single service, redirection services and communications services are commonly provided by different entities. Even when the host system, device and redirection service are provided for employee use in a corporate environment for example, a corporate information technology (IT) or like department can only control host system and redirection operations, and must normally interact with a communication network operator or communications service provider if any type of control of device functions is required. When a corporate user forgets a device password that must be entered correctly in order to use the device for example, a new password can normally only be set by the network operator, not by the corporate IT department. Involvement of network operators or external service providers may significantly complicate and thereby effectively preclude remote control of device operations by a corporate client or redirection or other device service provider.

SUMMARY

A system for remotely controlling mobile communication devices includes a redirection system, a remote control system and a mobile data communication device. The redirection system detects a triggering event at a host system and in response to the triggering event continuously redirects data items from the host system to a wireless network. The mobile data communication device receives data items from the wireless network and executes a plurality of device operations. The remote control system receives control information from a user interface and transmits the control information through the redirection system to the wireless network. The control information is received and executed by the mobile data communication device to remotely control one or more of the device operations.

According to another embodiment of the invention, a method for controlling the operation of a mobile data communication device in a communication system, wherein the communication system includes a redirection system that detects a triggering event at the host system and in response to the triggering event continuously redirects data items from the host system over a wireless network to the mobile data communication device, is also provided. The method comprises the steps of configuring the mobile communication device to perform a plurality of operations, receiving an administrative command that identifies at least one operation of the mobile communication device, generating a control message corresponding to the administrative command, transmitting the control message through the redirection system to the wireless network, receiving the control message with the mobile data communication device, and in response to the control message, automatically executing the administrative command on the mobile data communication device to cause the mobile data communication device to perform the identified operation.

DETAILED DESCRIPTION

Figure 1:
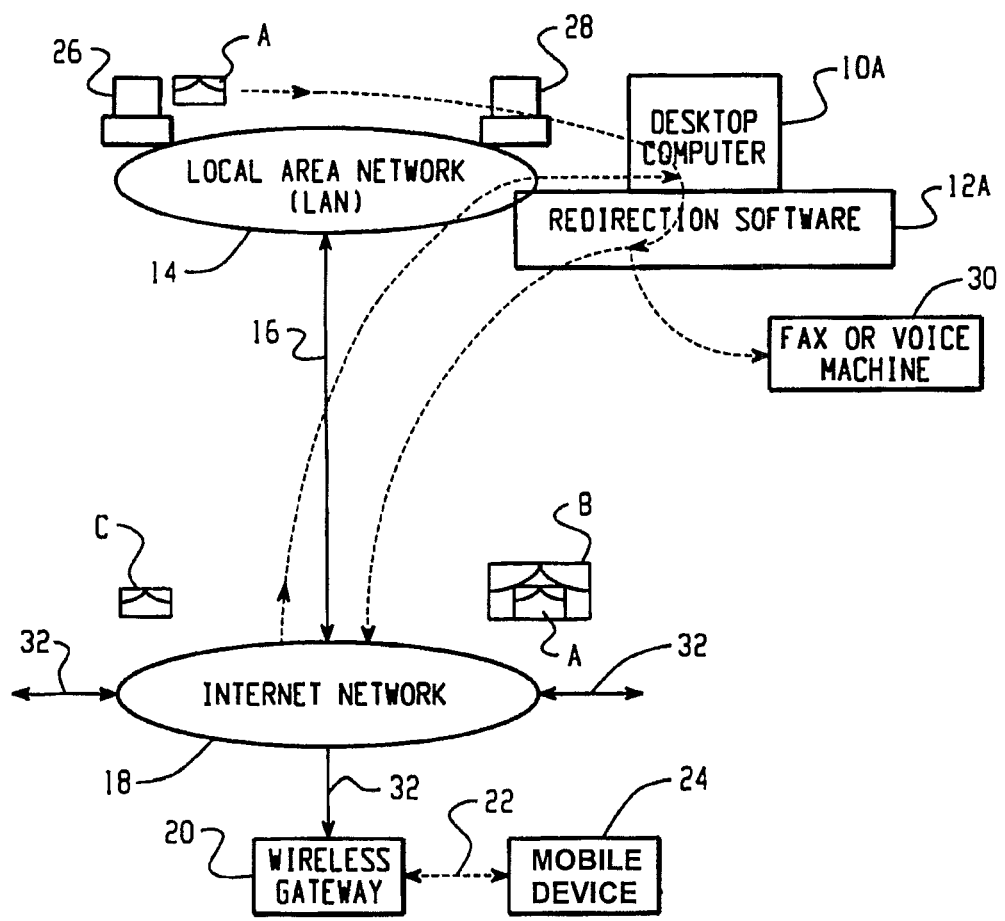
FIG. 1 is a system diagram showing the redirection of user data items from a user's desktop PC (host system) to the user's mobile data communication device.

A host system is a computer where a redirection system or redirector software is operating. The host system may be either a user's desktop PC, although, alternatively, the host system could be a network server connected to the user's PC via a local-area network ("LAN)", or could be any other system that is in communication with the user's desktop PC.

Instead of warehousing (or storing) the user's data items at the host system and then "synchronizing" a mobile data communication device to data items stored at the host system when the mobile device requests that such items of information be communicated to it, systems in which the present invention may be deployed preferably employ a "push" paradigm that continuously packages and retransmits the user-selected items of information to the mobile communication device in response to a triggering event detected at the host system. Wireless mobile data communications devices, especially those that can return a confirmation signal to the host that the pushed data has been received are especially well suited for this type of push paradigm. Due to the bandwidth limitations of wireless networks, redirection of only a portion of a user-selected data item may be desirable, with the user given the option of then retrieving the entire data item (or some other portion of the data item) from the host system.

A redirection system or redirector software program operating at the host system enables the user to redirect or mirror certain user-selected data items (or parts of data items) from the host system to the user's mobile data communication device upon detecting that one or more user-defined triggering events has occurred. Also operating at the host system are various sub-systems that may be configured to create triggering events, such as a screen saver sub-system or a keyboard sub-system, as well as sub-systems for repackaging the user's data items for transparent delivery to the mobile data device, such as a Transmission Control Protocol/Internet Protocol ("TCP/IP") sub-system or one or more E-Mail sub-systems. Other sub-systems for creating triggering events and repackaging the user's data items could also be present at the host system. The host system also includes a primary memory store where the user's data items are normally stored.

Using the redirector software program, the user can select certain data items for redirection, such as E-mail messages, calendar events, meeting notifications, address entries, journal entries, personal reminders etc. Having selected the data items for redirection, the user can then configure one or more event triggers to be sensed by the redirector program to initiate redirection of the user data items. These user-defined trigger points (or event triggers) include external events, internal events and networked events. Examples of external events include: receiving a message from the user's mobile data communication device to begin redirection; receiving a similar message from some external computer; sensing that the user is no longer in the vicinity of the host system; or any other event that is external to the host system. Internal events could be a calendar alarm, screen saver activation, keyboard timeout, programmable timer, or any other user-defined event that is internal to the host system. Networked events are user-defined messages that are transmitted to the host system from another computer coupled to the host system via a network to initiate redirection. These are just some of the examples of the types of user-defined events that can trigger the redirector program to push data items from the host to the mobile device. Although it is anticipated that the configuration that specifies which data items will be redirected and in what form will be set at the host system, such configuration may be set or modified through data sent from the mobile communications device.

In addition to the functionality noted above, a redirection system may provide a set of possibly software-implemented control functions for determining the type of mobile data communication device and its address, for programming a preferred list of message types that are to be redirected, and for determining whether the mobile device can receive and process certain types of message attachments, such as word processor or voice attachments. The determination of whether a particular mobile device can receive and process attachments is initially configured by the user of that mobile device at the host system. This configuration can be altered on a global or per message basis by transmitting a command message from the mobile device to the host system. If the redirector is configured so that the mobile data device cannot receive and process word processor or voice attachments, then the redirector routes these attachments to an external machine that is compatible with the particular attachment, such as an attached printer or networked fax machine or telephone. Other types of attachments could be redirected to other types of external machines in a similar fashion, depending upon the capabilities of the mobile device. For example, if a user is traveling and receives a message with an attachment that the user's mobile device can process or display, the user may send a command message from a mobile communications device to the host system indicating that that attachment is to be sent to a fax machine at a hotel where the user will be spending the evening. This enables the user to receive important E-mail attachments as long as the host system is provided with sufficient information about the destination where the attachment is to be forwarded.

Once an event has triggered redirection of the user data items, the host system may then repackage these items in a manner that is transparent to the mobile communication device, so that information on the mobile device appears similar to information on the user's host system. One repackaging method includes wrapping the user data items in an E-mail envelope that corresponds to the address of the mobile data communication device, although, alternatively, other repackaging methods could be used, such as special-purpose TCP/IP wrapping techniques, or other methods of wrapping the user selected data items. The repackaging preferably results in E-mail messages generated by the user from the mobile device to be transmitted from the host system, thus enabling the user to appear to have a single E-mail address, such that the recipients of messages sent from the mobile communications device do not know where the user was physically located when the message was first sent. The repackaging also permits both messages to the mobile device and sent from the mobile device to be encrypted and decrypted as well as compressed and decompressed.

In an alternative system and method, a redirection system is provided on a network server, and the server is programmed to detect numerous redirection event triggers over the network from multiple user desktop computers coupled to the server via a LAN. The server can receive internal event triggers from each of the user desktops via the network, and can also receive external event triggers, such as messages from the users' mobile data communication devices. In response to receiving one of these triggers, the server redirects the user's data items to the proper mobile data communication device. The user data items and addressing information for a particular mobile device can be stored at the server or at the user's PC. Using this alternative configuration, one redirector program can serve a plurality of users. This alternative configuration could also include an Internet- or intranet-based redirector program that could be accessible through a secure webpage or other user interface. The redirector program could be located on an Internet Service Provider's system and accessible only through the Internet.

In another alternative arrangement, a redirector program operates at both the host system and at the user's mobile data communication device. The user's mobile device then operates similarly to the host system described below, and is configured in a similar fashion to push certain user-selected data items from the mobile device to the user's host system (or some other computer) upon detecting an event trigger at the mobile device. This configuration provides two-way pushing of information from the host to the mobile device and from the mobile device to the host.

Referring now to the drawings, FIG. 1 is an example system diagram showing the redirection of user data items (such as message A or C) from a user's office PC (host system) 10A to the user's mobile data communication device 24, where the redirector software 12A is operating at the user's PC. Message A in FIG. 1 represents an internal message sent from desktop 26 to the user's host system 10A via LAN 14. Message C in FIG. 1 represents an external message from a sender that is not directly connected to LAN 14, such as the user's mobile data communication device 24, some other user's mobile device (not shown), or any user connected to the Internet 18. Message C also represents a command message from the user's mobile data communication device 24 to the host system 10A. As described in more detail in FIG. 3, the host system 10 preferably includes, along with the typical hardware and software associated with a workstation or desktop computer, the redirector program 12A, a TCP/IP subsystem 42, a primary message store 40, an E-mail subsystem 44, a screen saver subsystem 48, and a keyboard subsystem 46.

In FIG. 1, the host system 10A is the user's desktop system, typically located in the user's office. The host system 10A is connected to a LAN 14, which also connects to other computers 26, 28 that may be in the user's office or elsewhere. The LAN 14, in turn, is connected to a wide area network ("WAN") 18, preferably the Internet, which is defined by the use of TCP/IP to exchange information, but which, alternatively could be any other type of WAN. The connection of the LAN 14 to the WAN 18 is via high bandwidth link 16, typically a T1 or T3 connection. The WAN 18 in turn is connected to a variety of gateways, via connections 32. A gateway forms a connection or bridge between the WAN 18 and some other type of network, such as an RF wireless network, cellular network, satellite network, or other synchronous or asynchronous land-line connection.

In the example of FIG. 1, a wireless gateway 20 is connected to the Internet for communicating via wireless link 22 to a plurality of wireless mobile data communication devices 24. Also shown in FIG. 1 is machine 30, which could be a FAX machine, a printer, a system for displaying images (such as video), a machine capable of processing and playing audio files, such as a voice mail system, or some other type of peripheral system or device. Certain message attachments may be redirected to such an external machine 30 if the redirector program configuration data reflects that the mobile device 24 cannot receive and process the attachments, or if the user has specified that certain attachments are not to be forwarded to mobile device 24, even if such device can process those attachments. By way of example, consider an E-mail sent to a user that includes three attachments—a word processing document, a video clip and an audio clip. The redirection program could be configured to send the text of the E-mail to the remote device, to send the word processing document to a networked printer located near the user, to send the video clip to a store accessible through a secure connection through the Internet and to send the audio clip to the user's voice mail system. This example is not intended to be limiting, but rather to illustrate the variety of possibilities embodied in the redirection concept.

Figure 4:
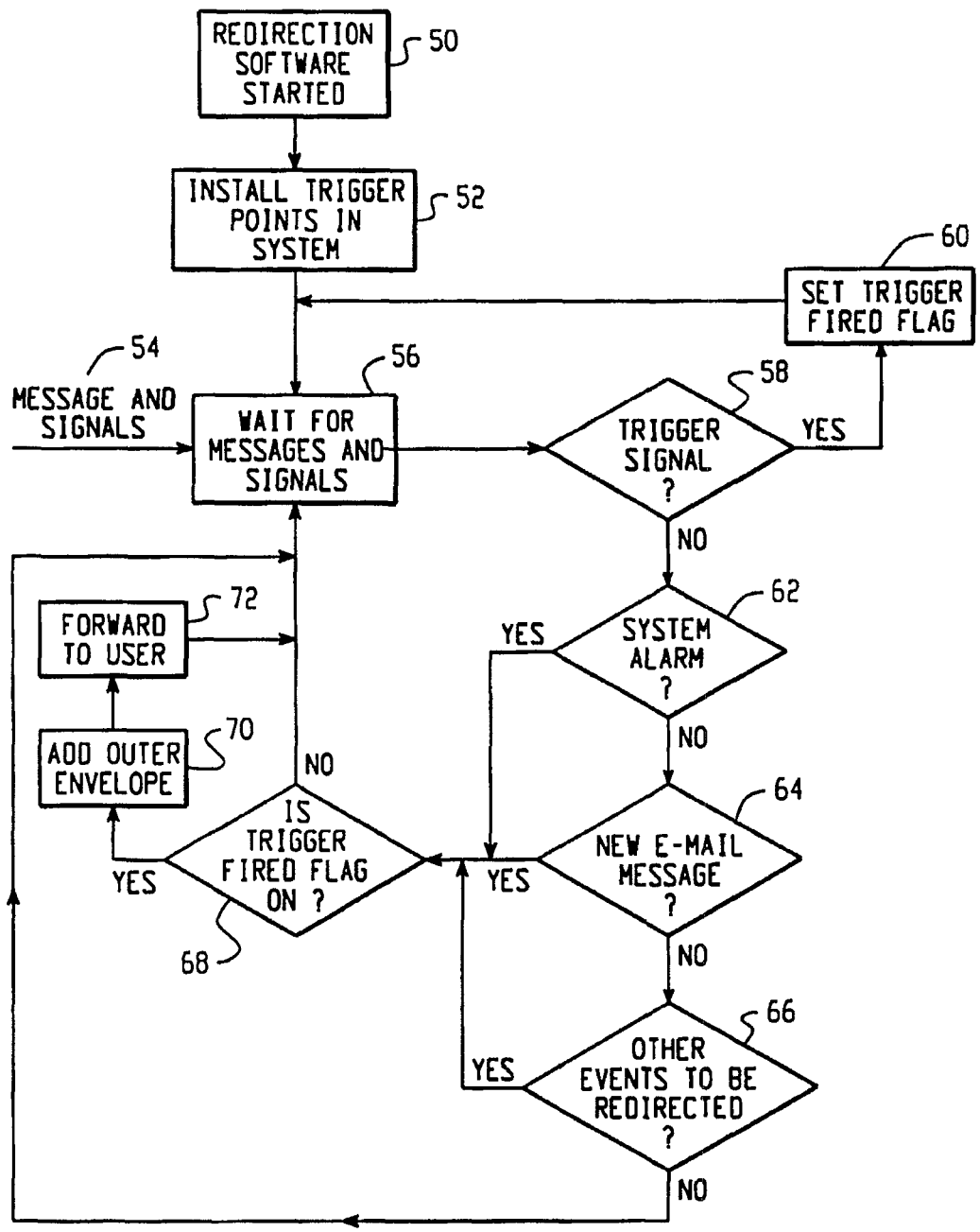
FIG. 4 is a flow chart showing the steps carried out by exemplary redirector software operating at the host system.

The mobile data communication device 24 may be a handheld two-way wireless paging computer, a wirelessly enabled palm-top computer, a mobile telephone with data messaging capabilities, or a wirelessly enabled laptop computer, but could, alternatively be other types of mobile data communication devices capable of sending and receiving messages via a network connection 22. Although the system may operate in a two-way communications mode, certain aspects of the redirection could be beneficially used in a "one and one-half" or acknowledgment paging environment, or even with a one-way paging system. The mobile data communication device 24 may be configured, for example via software program instructions, to work in conjunction with the redirector program 12A to enable the seamless, transparent redirection of user-selected data items. FIG. 4 describes the basic method steps of an example redirector program, and FIG. 5 describes the steps of a corresponding program which may be operating at the mobile device 24.

In an alternative system not explicitly shown in the drawings, the mobile device 24 also includes a redirector program. User selected data items can be replicated from the host to the mobile device and vice versa. The configuration and operation of the mobile device 24 having a redirector program is similar to that described herein with respect to FIGS. 1-5.

A user can preferably configure the redirector program 12A to push certain user-selected data items to the user's mobile data communication device 24 when the redirector 12A detects that a particular user-defined event trigger (or trigger point) has taken place. User-selected data items preferably include E-mail messages, calendar events, meeting notifications, address entries, journal entries, personal alerts, alarms, warnings, stock quotes, news bulletins, etc., but could, alternatively, include any other type of message that is transmitted to the host system 10A, or that the host system 10A acquires through the use of intelligent agents, such as data that is received after the host system 10A initiates a search of a database or a website or a bulletin board. In some instances, only a portion of the data item is transmitted to the mobile device 24 in order to minimize the amount of data transmitted via the wireless network 22. In these instances, the mobile device 24 can optionally send a command message to the host system to receive more or all of the data item if the user desires to receive it.

Among the user-defined event triggers that can be detected by the redirector program 12A are external events, internal events and networked events. External events preferably include: (1) receiving a command message (such as message C) from the user's mobile data communication device to begin redirection, or to execute some other command at the host, such as a command to enable the preferred list mode, or to add or subtract a particular sender from the preferred list; (2) receiving a similar message from some external computer; and (3) sensing that the user is no longer in the vicinity of the host system; although, alternatively, an external event can be any other detectable occurrence that is external to the host system. Internal events could be a calendar alarm, screen saver activation, keyboard timeout, programmable timer, or any other user-defined event that is internal to the host system. Networked events are user-defined messages that are transmitted to the host system from another computer coupled to the host system via a network to initiate redirection. These are just some of the events that could be used to initiate replication of the user-selected data items from the host system 10 to the mobile device 24.

FIG. 1 shows an E-mail message A being communicated over LAN 14 from computer 26 to the user's desktop system 10A (also shown in FIG. 1 is an external message C, which could be an E-mail message from an Internet user, or could be a command message from the user's mobile device 24). Once the message A (or C) reaches the primary message store of the host system 10A, it can be detected and acted upon by the redirection software 12A. The redirection software 12A can use many methods of detecting new messages. One method of detecting new messages is using Microsoft® Messaging API ("MAPI"), in which programs, such as the redirector program 12A, register for notifications or 'advise syncs' when changes to a mailbox take place. Other methods of detecting new messages could also be used, and will be described in further detail below.

Assuming that the redirector software program 12A is activated, and has been configured by the user (either through the sensing of an internal, network or external event) to replicate certain user data items (including messages of type A or C) to the mobile device 24, when the message A is received at the host system 10A, the redirector software program 12A detects its presence and prepares the message for redirection to the mobile device 24. In preparing the message for redirection, the redirector software program 12A could compress the original message A, could compress the message header, or could encrypt the entire message A to create a secure link to the mobile device 24.

Also programmed into the redirector software program 12A is the address of the user's mobile data communication device 24, the type of device, and whether the device 24 can accept certain types of attachments, such as word processing or voice attachments. If the user's type of mobile device cannot accept these types of attachments, then the redirector software program 12A can be programmed to route the attachments to a fax or voice number where the user is located using an attached fax or voice machine 30.

The redirector software program 12A may also be programmed with a preferred list mode that is configured by the user either at the host system 10A, or remotely from the user's mobile data communication device by transmitting a command message C. The preferred list contains a list of senders (other users) whose messages are to be redirected or a list of message characteristics that determine whether a message is to be redirected. If activated, the preferred list mode causes the redirector software program 12A to operate like a filter, only redirecting certain user data items based on whether the data item was sent from a sender on the preferred list or has certain message characteristics that if present will trigger or suppress redirection of the message. In the example of FIG. 1, if desktop system 26 was operated by a user on the preferred list of host system 10A, and the preferred list option was activated, then message A would be redirected. If, however, desktop 26 was operated by a user not on the host system's preferred list, then message A would not be redirected, even if the user of the host system had configured the redirector to push messages of type A. The user of the host system 10A can configure the preferred list directly from the desktop system, or, alternatively, the user can then send a command message (such as C) from the mobile device 24 to the desktop system 10A to activate the preferred list mode, or to add or delete certain senders or message characteristics from the preferred list that was previously configured. It should be appreciated that a redirection program could combine message characteristics and preferred sender lists to result in a more finely-tuned filter. Messages marked as low priority or that are simple return receipts or message read receipts, for example, could always be suppressed from redirection while messages from a particular sender would always be redirected.

After the redirector software program 12A has determined that a particular message should be redirected, and it has prepared the message for redirection, the software 12A then sends the message A to a secondary memory store located in the mobile device 24, using whatever means are necessary. For example, the message A may be sent back over the LAN 14, WAN 18, and through the wireless gateway 20 to the mobile data communication device 24. In doing so, the redirector preferably repackages message A as an E-mail with an outer envelope B that contains the addressing information of the mobile device 24, although alternative repackaging techniques and protocols could be used, such as a TCP/IP repackaging and delivery method (most commonly used in the alternative server configuration shown in FIG. 2). The wireless gateway 20 requires this outer envelope information B in order to know where to send the redirected message A. Once the message (A in B) is received by the mobile device 24, the outer envelope B is removed and the original message A is placed in the secondary memory store within the mobile device 24. Repackaging and removing the outer envelope in this manner causes the mobile device 24 to appear to be at the same physical location as the host system 10, thus creating a transparent system.

In the case where message C is representative of an external message from a computer on the Internet 18 to the host system 10A, and the host 10A has been configured to redirect messages of type C, then in a similar manner to message A, message C would be repackaged with an outer envelope B and transmitted to the user's mobile device 24. In the case where message C is representative of a command message from the user's mobile device 24 to the host system 10A, the command message C is not redirected, but is acted upon by the host system 10A.

If the redirected user data item is an E-mail message, as described above, the user at the mobile device 24 sees the original subject, sender's address, destination address, carbon copy and blind carbon copy. When the user replies to this message, or when the user authors a new message, the software operating at the mobile device 24 adds a similar outer envelope to the reply message (or the new message) to cause the message to be routed first to the user's host system 10A, which then removes the outer envelope and redirects the message to the final destination, such as back to computer 26. This preferably results in the outgoing redirected message from the user's host system 10A being sent using the E-mail address of the host mailbox, rather than the address of the mobile device, so that it appears to the recipient of the message that the message originated from the user's desktop system 10A rather than the mobile data communication device. Any replies to the redirected message will then be sent to the desktop system 10A, which if it is still in redirector mode, will repackage the reply and resend it to the user's mobile data device, as described above.

Figure 2:
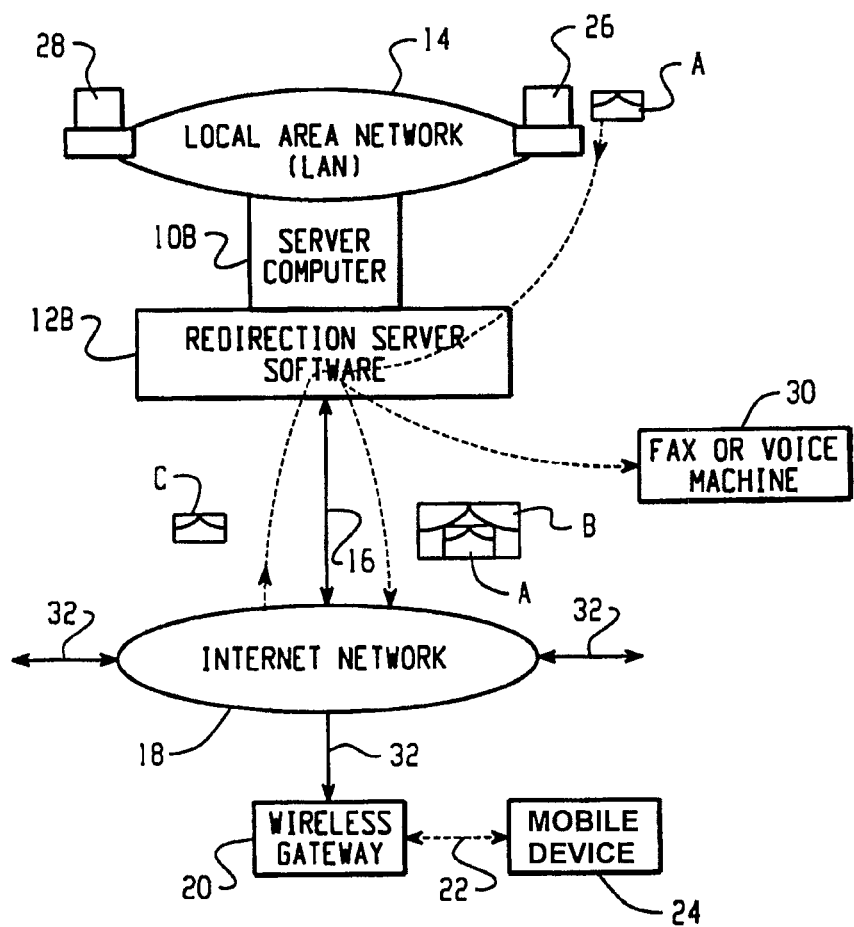
FIG. 2 is a system diagram showing the redirection of user data items from a network server (host system) to the user's mobile data communication device.

FIG. 2 is an alternative system diagram showing the redirection of user data items from a network server 10B to the user's mobile data communication device 24, where the redirector software 12B is operating at the server 10B. This configuration is particularly advantageous for use with message servers such as a Microsoft Exchange Server or a Lotus™ Domino™ Server, which are normally operated so that all user messages are stored in one central location or mailbox store on the server instead of in a store within each user's desktop PC. This configuration has the additional advantage of allowing a single system administrator to configure and keep track of all users having messages redirected. If the system includes encryption keys, these too can be kept at one place for management and update purposes. As will become apparent from the description below, a server-based redirection system such as shown in FIG. 2 also facilitates remote control of mobile communication devices for any or all users enabled for message redirection from the server. Although such control may also be applicable for users of desktop computer redirection software 12A (FIG. 1), it is contemplated that remote device control systems and methods in accordance with the invention will be more often implemented with server-based redirection systems, where confidential and otherwise highly sensitive information may be redirected to mobile communication devices.

As will be described in further detail below, the server 10B preferably maintains a user profile for each user's desktop system 26, 28, including information such as whether or not a particular user can have data items redirected, which types of message and information to redirect, what events will trigger redirection, the address of the users' mobile data communication device 24, the type of mobile device, and the user's preferred list, if any. The event triggers are preferably detected at the user's desktop system 26, 28 and can be any of the external, internal or network events listed above. The desktop systems 26, 28 preferably detect these events and then transmit a message to the server computer 10B via LAN 14 to initiate redirection. Although the user data items are preferably stored at the server computer 10B in this embodiment, they could, also or alternatively, be stored at each user's desktop system 26, 28, which would then transmit them to the server computer 10B after an event has triggered redirection. In the above example of a Lotus Domino Server, a user's mail file may exist at both the server and a user's desktop computer system.

In FIG. 2, desktop system 26 generates a message A that is transmitted to and stored at the host system 10B, which is the network server operating the redirector program 12B. The message A is for desktop system 28, but in this embodiment, user messages are stored at the network server 10B. When an event occurs at desktop system 28, an event trigger is generated and transmitted to the network server 10B, which then determines who the trigger is from, whether that desktop has redirection capabilities, and if so, the server (operating the redirector program) uses the stored configuration information to redirect message A to the mobile device 24 associated with the user of desktop system 28.

As described above with reference to FIG. 1, message C could be either a command message from a user's mobile data communication device 24, or it could be a message from an external computer, such as a computer connected to the Internet 18. If the message C is from an Internet computer to the user's desktop system 28, and the user has redirection capabilities, then the server 10B detects the message C, repackages it using electronic envelope B, and redirects the repackaged message (C in B) to the user's mobile device 24. If the message C is a command message from the user's mobile device 24, then the server 10B simply acts upon the command message.

Figure 3:
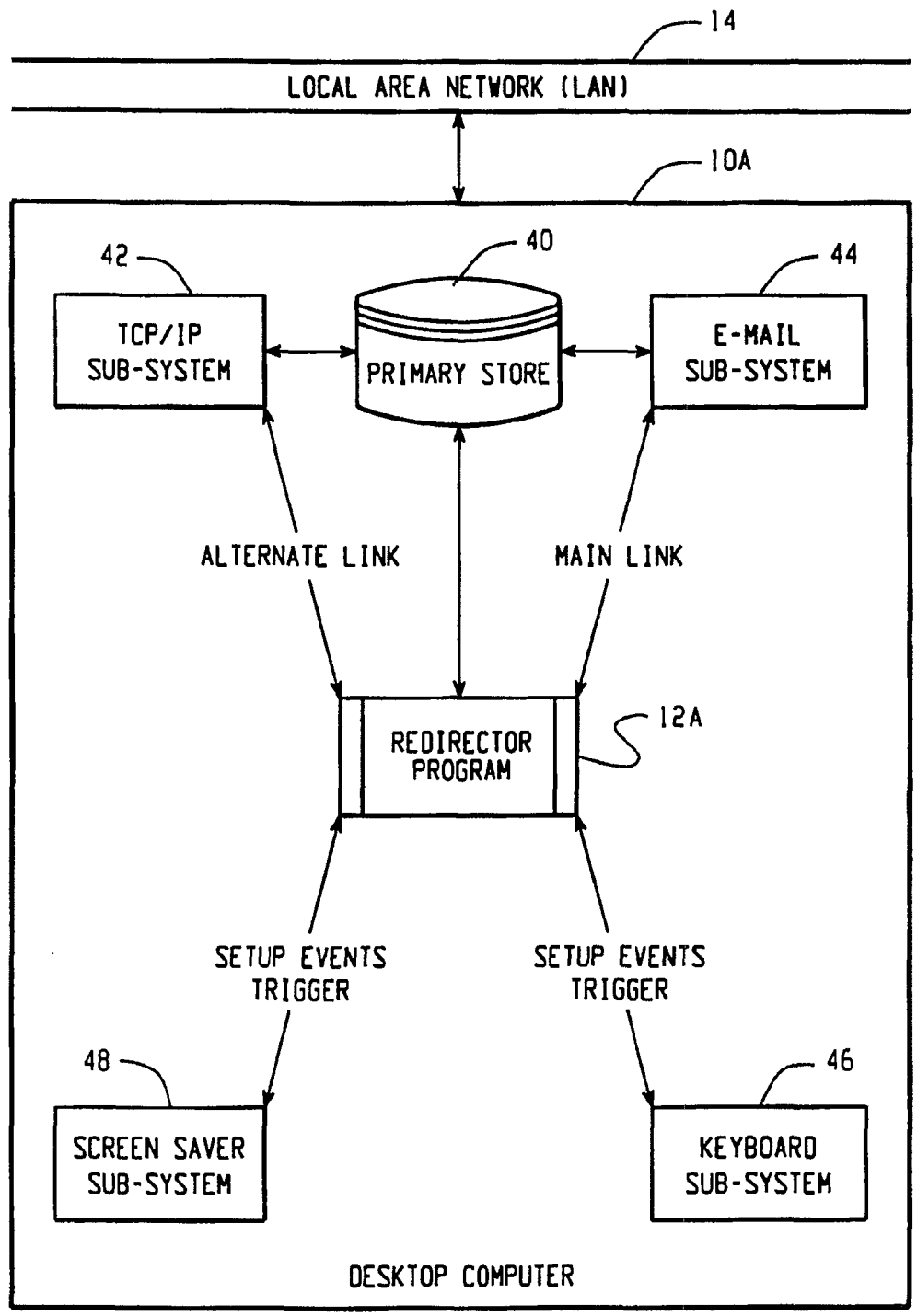
FIG. 3 is a block diagram showing the interaction of redirector software with other components of the host system in FIG. 1.

FIG. 3 is a block diagram showing the interaction of the redirector software 12A with additional components of the host system 10A of FIG. 1 (the desktop PC) to enable more fully the pushing of information from the host system 10A to the user's mobile data communication device 24 is set forth. These additional components are illustrative of the type of event-generating systems that can be configured and used with the redirector software 12A, and of the type of repackaging systems that can be used to interface with the mobile communication device 24 to make it appear transparent to the user.

The desktop system 10A is connected to LAN 14, and can send and receive data, messages, signals, event triggers, etc., to and from other systems connected to the LAN 14 and to external networks 18, 22, such as the Internet or a wireless data network, which are also coupled to the LAN 14. In addition to the standard hardware, operating system, and application programs associated with a typical microcomputer or workstation, the desktop system 10A includes the redirector program 12A, a TCP/IP sub-system 42, an E-mail sub-system 44, a primary data storage device 40, a screen saver sub-system 48, and a keyboard sub-system 46. The TCP/IP and E-mail subsystems 42, 44 are examples of repackaging systems that can be used to achieve the transparency of the redirection, and the screen saver and keyboard sub-systems 46, 48 are examples of event generating systems that can be configured to generate event messages or signals that trigger redirection of the user selected data items.

The method steps carried out by the redirector program 12A are described in more detail by way of illustrative example in FIG. 4. The basic functions of this program are to: (1) configure and setup the user-defined event trigger points that will start redirection; (2) configure the types of user data items for redirection and optionally configure a preferred list of senders whose messages are to be redirected; (3) configure the type and capabilities of the user's mobile data communication device; (4) receive messages and signals from the repackaging systems and the event generating systems; and (5) command and control the redirection of the user-selected data items to the mobile data communication device via the repackaging systems. Other functions not specifically enumerated could also be integrated into this program.

The E-Mail sub-system 44 is the preferred link to repackaging the user-selected data items for transmission to the mobile data communication device 24, and preferably uses industry standard mail protocols, such as SMTP, POP, IMAP, MIME and RFC-822, to name but a few. The E-Mail sub-system 44 can receive messages A from external computers on the LAN 14, or can receive messages C from some external network such as the Internet 18 or a wireless data communication network 22, and stores these messages in the primary data store 40. Assuming that the redirector program 12A has been triggered to redirect messages of this type, the redirector detects the presence of any new messages and instructs the E-Mail system 44 to repackage the message by placing an outer wrapper B about the original message A (or C), and by providing the addressing information of the mobile data communication device 24 on the outer wrapper B. As noted above, this outer wrapper B is removed by the mobile device 24, and the original message A (or C) is then recovered, thus making the mobile device 24 appear to be the desktop system 10A.

In addition, the E-Mail sub-system 44 receives messages back from the mobile device 24 having an outer wrapper with the addressing information of the desktop system 10A, and strips this information away so that the message can be routed to the proper sender of the original message A (or C). The E-Mail sub-system also receives command messages C from the mobile device 24 that are directed to the desktop system 10A to trigger redirection or to carry out some other function. The functionality of the E-Mail sub-system 44 is controlled by the redirector program 12A.

The TCP/IP sub-system 42 is an alternative repackaging system. It includes all of the functionality of the E-Mail sub-system 44, but instead of repackaging the user-selected data items as standard E-mail messages, this system repackages the data items using special-purpose TCP/IP packaging techniques. This type of special-purpose sub-system is useful in situations where security and improved speed are important to the user. The provision of a special-purpose wrapper that can only be removed by special software on the mobile device 24 provides the added security, and the bypassing of E-mail store and forward systems can improve speed and real-time delivery.

As described previously, redirection may be initiated upon detecting numerous external, internal and networked events, or trigger points. Examples of external events include: receiving a command message from the user's mobile data communication device 24 to begin redirection; receiving a similar message from some external computer; sensing that the user is no longer in the vicinity of the host system; or any other event that is external to the host system. Internal events could be a calendar alarm, screen saver activation, keyboard timeout, programmable timer, or any other user-defined event that is internal to the host system. Networked events are user-defined messages that are transmitted to the host system from another computer that is connected to the host system via a network to initiate redirection.

The screen saver and keyboard sub-systems 46, 48 are examples of systems that are capable of generating internal events. Functionally, the redirector program 12A provides the user with the ability to configure the screen saver and keyboard systems so that under certain conditions an event trigger will be generated that can be detected by the redirector 12A to start the redirection process. For example, the screen saver system can be configured so that when the screen saver is activated, after, for example, 10 minutes of inactivity on the desktop system, an event trigger is transmitted to the redirector 12A, which starts redirecting the previously selected user data items. In a similar manner the keyboard sub-system can be configured to generate event triggers when no key has been depressed for a particular period of time, thus indicating that redirection should commence. These are just two examples of the numerous application programs and hardware systems internal to the host system 10A that can be used to generate internal event triggers.

Figure 5:
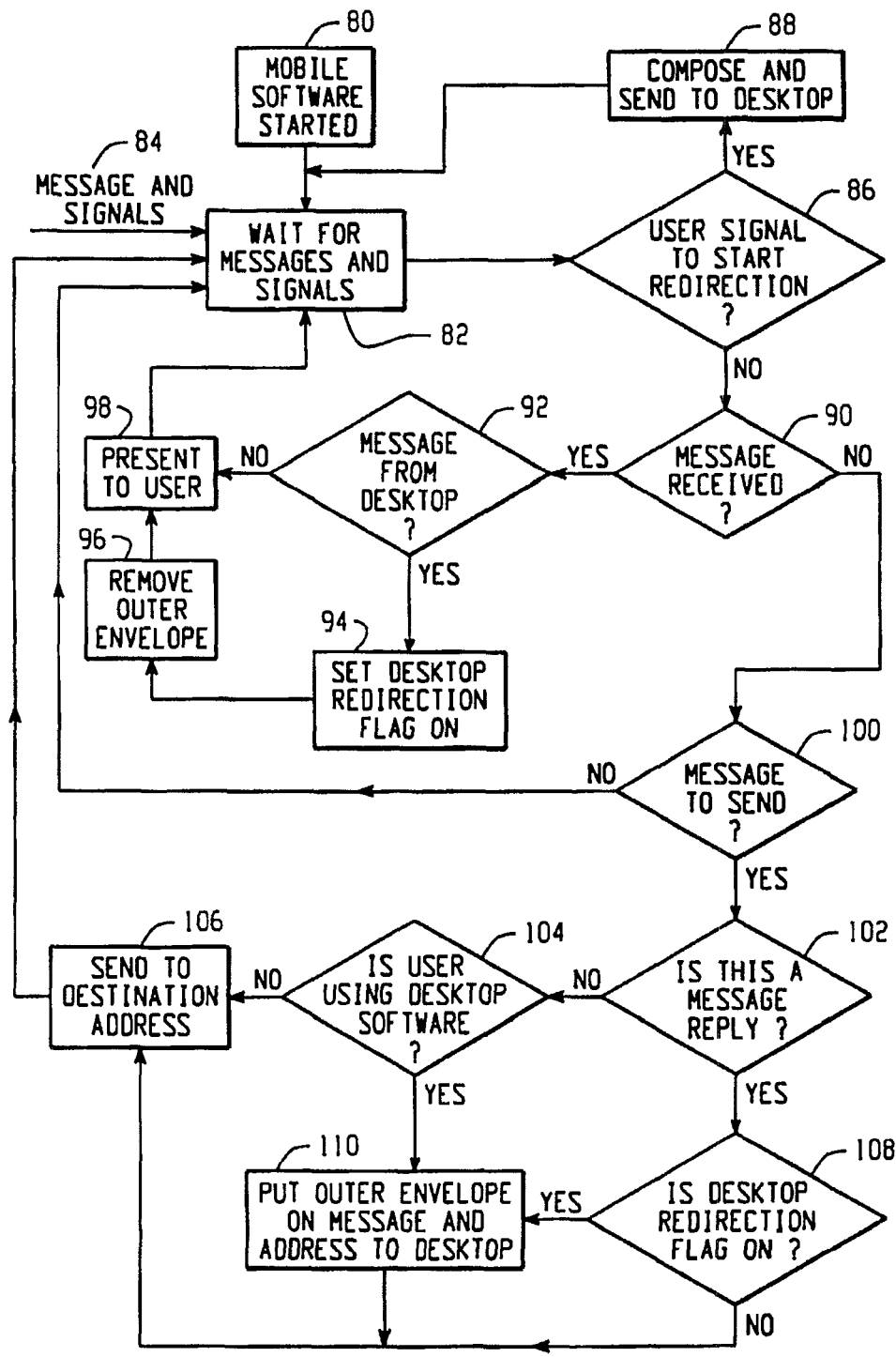
FIG. 5 is a flow chart showing an example of steps that may be carried out by the mobile data communication device to interface with redirector software as represented in FIG. 4, operating at the host system.

FIGS. 4 and 5, are flow charts showing steps that may be carried out, respectively, by the redirector software 12A operating at the host system 10A, and by the mobile data communication device 24 in order to interface with the host system. Turning first to FIG. 4, at step 50, the redirector program 12A is started and initially configured. The initial configuration of the redirector 12A includes: (1) defining the event triggers that the user has determined will trigger redirection; (2) selecting the user data items for redirection; (3) selecting the repackaging sub-system, either standard E-Mail, or special-purpose technique; (4) selecting the type of data communication device, indicating whether and what type of attachments the device is capable of receiving and processing, and inputting the address of the mobile device; and (5) configuring the preferred list of user selected senders whose messages are to be redirected.

FIG. 4 sets forth the basic steps of an example redirector program 12A assuming it is operating at a desktop system 10A, such as shown in FIG. 1. If the redirector 12B is operating at a network server 12B, as shown in FIG. 2, then additional configuration steps may be necessary to enable redirection for a particular desktop system 26, 28 connected to the server, including: (1) setting up a profile for the desktop system indicating its address, events that will trigger redirection, and the data items that are to be redirected upon detecting an event; (2) maintaining a storage area at the server for the data items; and (3) storing the type of data communication device to which the desktop system's data items are to be redirected, whether and what type of attachments the device is capable of receiving and processing, and the address of the mobile device.

Once the redirector program is configured 50, the trigger points (or event triggers) are enabled at step 52. The program 12A then waits 56 for messages and signals 54 to begin the redirection process. A message could be an E-Mail message or some other user data item than may have been selected for redirection, and a signal could be a trigger signal, or could be some other type of signal that has not been configured as an event trigger. When a message or signal is detected, the program determines 58 whether it is one of the trigger events that has been configured by the user to signal redirection. If so, then at step 60 a trigger flag is set, indicating that subsequently received user data items (in the form of messages) that have been selected for redirection should be pushed to the user's mobile data communication device 24.

If the message or signal 54 is not a trigger event, the program then determines at steps 62, 64 and 66 whether the message is, respectively, a system alarm 62, an E-Mail message 64, or some other type of information that has been selected for redirection. If the message or signal is none of these three items, then control returns to step 56, where the redirector waits for additional messages 54 to act upon. If, however the message is one of these three types of information, then the program 12A determines, at step 68, whether the trigger flag has been set, indicating that the user wants these items redirected to the mobile device. If the trigger flag is set, then at step 70, the redirector 12A causes the repackaging system (E-Mail or TCP/IP) to add the outer envelope to the user data item, and at step 72 the repackaged data item is then redirected to the user's mobile data communication device 24 via LAN 14, WAN 18, wireless gateway 20 and wireless network 22. Control then returns to step 56 where the program waits for additional messages and signals to act upon. Although not shown explicitly in FIG. 4, after step 68, the program could, if operating in the preferred list mode, determine whether the sender of a particular data item is on the preferred list, and if not, then the program would skip over steps 70 and 72 and proceed directly back to step 56. If the sender was on the preferred list, then control would similarly pass to steps 70 and 72 for repackaging and transmission of the message from the preferred list sender.

FIG. 5 sets forth the method steps carried out by the user's mobile data communication device 24 in order to interface to the redirector program 12A. At step 80 the mobile software is started and the mobile device 24 is configured to operate with the redirector program 12A, including storing the address of the user's desktop system 10A, for example.

At step 82, the mobile device waits for messages and signals 84 to be generated or received. Assuming that the redirector software 12A operating at the user's desktop system 10A is configured to redirect upon receiving a message from the user's mobile device 24, at step 86, the user can decide to generate a command message that will start redirection. If the user does so, then at step 88 the redirection message is composed and sent to the desktop system 10A via the wireless network 22, through the wireless gateway 20, via the Internet 18 to the LAN 14, and is finally routed to the desktop machine 10A. In this situation where the mobile device 24 is sending a message directly to the desktop system 10A, no outer wrapper is added to the message (such as message C in FIGS. 1 and 2). In addition to the redirection signal, the mobile device 24 could transmit any number of other commands to control the operation of the host system, and in particular the redirector program 12A. For example, the mobile 24 could transmit a command to put the host system into the preferred list mode, and then could transmit additional commands to add or subtract certain senders from the preferred list. In this manner, the mobile device 24 can dynamically limit the amount of information being redirected to it by minimizing the number of senders on the preferred list. Other example commands include: (1) a message to change the configuration of the host system to enable the mobile device 24 to receive and process certain attachments; and (2) a message to instruct the host system to redirect an entire data item to the mobile device in the situation where only a portion of a particular data item has been redirected.

Turning back to FIG. 5, if the user signal or message is not a direct message to the desktop system 10A to begin redirection (or some other command), then control is passed to step 90, which determines if a message has been received. If a message is received by the mobile, and it is a message from the user's desktop 10A, as determined at step 92, then at step 94 a desktop redirection flag is set "on" for this message, and control passes to step 96 where the outer envelope is removed. Following step 96, or in the situation where the message is not from the user's desktop, as determined at step 92, control passes to step 98, which displays the message for the user on the mobile device's display. The mobile unit 24 then returns to step 82 and waits for additional messages or signals.

If the mobile device 24 determines that a message has not been received at step 90, then control passes to step 100, where the mobile determines whether there is a message to send. If not, then the mobile unit returns to step 82 and waits for additional messages or signals. If there is at least one message to send, then at step 102 the mobile determines whether it is a reply message to a message that was received by the mobile unit. If the message to send is a reply message, then at step 108, the mobile determines whether the desktop redirection flag is on for this message. If the redirection flag is not on, then at step 106 the reply message is simply transmitted from the mobile device to the destination address via the wireless network 22. If, however, the redirection flag is on, then at step 110 the reply message is repackaged with the outer envelope having the addressing information of the user's desktop system 10A, and the repackaged message is then transmitted to the desktop system 10A at step 106. As described above, the redirector program 12A executing at the desktop system then strips the outer envelope and routes the reply message to the appropriate destination address using the address of the desktop system as the "from" field, so that to the recipient of the redirected message, it appears as though it originated from the user's desktop system rather than the mobile data communication device.

If, at step 102, the mobile device determines that the message is not a reply message, but an original message, then control passes to step 104, where the mobile device determines if the user is using the redirector software 12A at the desktop system 10A, by checking the mobile device's configuration. If the user is not using the redirector software 12A, then the message is simply transmitted to the destination address at step 106. If, however, the mobile determines that the user is using the redirector software 12A at the desktop system 10A, then control passes to step 110, where the outer envelope is added to the message. The repackaged original message is then transmitted to the desktop system 10A at step 106, which, as described previously, strips the outer envelope and routes the message to the correct destination. Following transmission of the message at step 106, control of the mobile device returns to step 82 and waits for additional messages or signals.

Having described redirection of data items from a host system to a mobile communication device, server-based systems and methods for data item redirection and control of redirection and device configuration settings will now be described.

Figure 6:
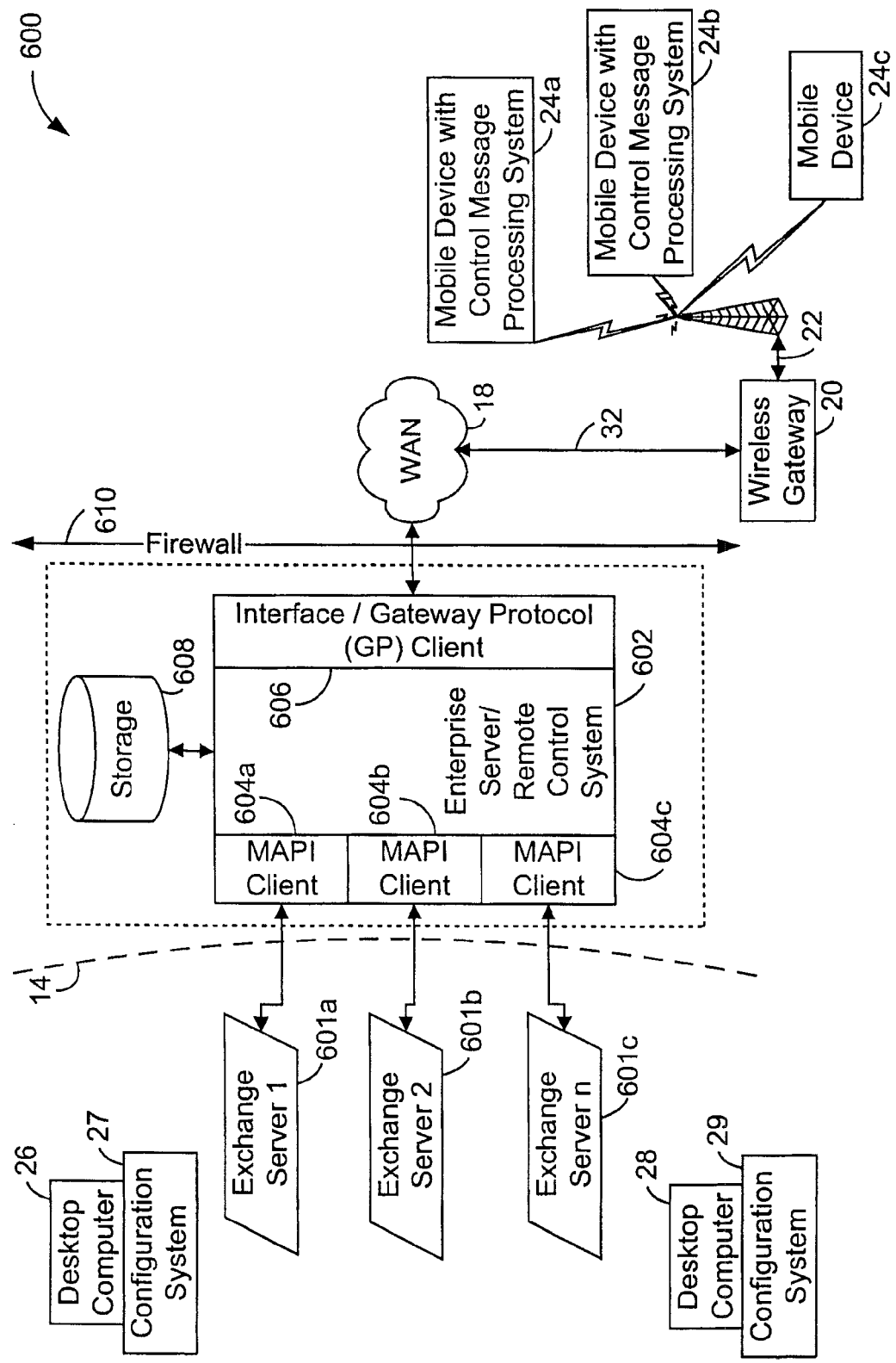
FIG. 6 is a block diagram of an example network server-based redirection system.

FIG. 6 shows a redirection system, similar to the system of FIG. 2, in which redirection software is running on a server computer in a network. The system in FIG. 6 relates to redirection of E-mail messages from a network to one or more mobile communication devices 24 associated with desktop computers 26, 28 in the network 14. The presence of further desktop computers, workstations and other network servers has been indicated generally by the dotted line 14, which represents a LAN in FIG. 6. The LAN 14 is preferably a corporate network in which employee workstations are configured to operate. As described above in conjunction with FIG. 2, it is assumed in FIG. 6 that E-mail is stored at the messaging servers 601 in the network 14, or alternatively forwarded to the servers when redirection is initiated.

As shown in FIG. 6, the system 600 includes one or more messaging server computers 601a, 601b, 601c, and desktop computers 26, 28 in LAN 14, a further server computer 602, a storage unit 608, a WAN 18, a communication link 32, wireless gateway 20, and a link 22 to mobile devices 24a, 24b, 24c. The server computer 602 includes a plurality of MAPI clients 604a, 604b, 604c and an interface 606. In addition, the server computer 602 may include, execute, or access a remote control message or data generation system, and any or all of the mobile devices 24 may execute a control message policy processing system, as described in detail below.

The server 602 accesses all of the messaging servers in LAN 14 from which redirection is to be enabled and implements the redirection server software 12B shown in FIG. 2. As discussed above, LAN 14 is preferably a corporate network which extends throughout corporate premises or an entire corporate enterprise. Server 602 is therefore typically referred to as an enterprise server. The enterprise server 602 accesses all of the messaging servers 601, shown in FIG. 6 as Microsoft Exchange servers, via the MAPI clients 604 to detect incoming E-mail messages and possibly other data items to be redirected from desktop systems 26, 28 in the network 14 to associated mobile devices 24. The enterprise server 602 also couples the messaging servers 601 through a WAN 18, such as the Internet, and link 32 to the wireless gateway 20. The system operates as described above to continuously redirect messages from desktop systems in the network 14 to corresponding mobile devices 24 in response to redirection triggers or events. Information on the desktop systems is thereby mirrored on the mobile devices 24.

On the corporate network side, enterprise server 602 implements MAPI clients 604a, 604b, 604c to interface with each Exchange server 601a, 601b, 601c. Although multiple Exchange servers are shown in FIG. 6, relatively small networks with few users may have only a single Exchange server, such that a single MAPI client 604 would be implemented in the enterprise server 602. In the event that further Exchange servers 601 are added to an existing network 14 after installation of the enterprise server 602, a corresponding number of new MAPI clients 604 could be added to the enterprise server 602 to enable redirection of messages from such additional servers, provided that the capacity of the enterprise server 602 is not exceeded.

An Exchange server such as server 601a, 601b or 601c is conceptually a form of database server arranged according to some logical topology comprising different hierarchical levels. MAPI clients can be set up to receive notifications of any of a plurality of changes occurring at any of the levels within the topology. For example, a MAPI client may be configured to receive notification of changes at a mailbox level, a user level, or a folder level. MAPI clients 604a, 604b, 604c may be configured to receive notifications of changes to any mailboxes on the Exchange servers 601 which are "wirelessly enabled" or configured for redirection of incoming messages to a mobile device 24, such that E-mail messages and other data items arriving at wirelessly enabled mailboxes are redirected to respective corresponding mobile devices 24. The enterprise server 602 maintains a list of users whose mailboxes are wirelessly enabled and thereby determines for which mailboxes the MAPI clients 604 should receive notifications.

If redirection has not been activated by a redirection trigger, then changes to the user's mailbox are not of particular importance to the enterprise server 602. Depending upon the configuration of the Exchange servers 601, the enterprise server 602 and its MAPI clients 604, however, notifications of such mailbox changes may be continuously provided by the Exchange servers 601 to the enterprise server 602 even when redirection is not active. In such a case, the enterprise server 602 may be configured to ignore notifications unless or until a redirection trigger for the particular user is detected. Alternatively, the Exchange servers 601 may provide the mailbox change notifications only when redirection is active, i.e. after a redirection trigger occurs. Mailbox change notification timing may therefore be controlled either at the Exchange servers 601 or the enterprise server 602. In one possible embodiment of a redirection system, the MAPI clients 604 on the enterprise server 602 are designed to implement the desired notification scheme in order to provide for simpler installation of the enterprise server 602 in an existing network 14.

The enterprise server 602 may be configured to respond to only particular selected mailbox changes among the many possible changes that may occur within a user's mailbox. Even though the Exchange servers 601 may provide notifications of all changes to all mailboxes, only certain changes to wirelessly enable mailboxes will require any action by the enterprise server 602. For example, although the Exchange servers 601 may provide notifications to the MAPI clients 604 on enterprise server 602 when messages are moved from one folder to another within a user's mailbox or deleted from a folder or folders in a user's mailbox, redirection operations might be required by the enterprise server 602 only if a user has configured redirection settings to maintain folder synchronization between the mailbox and the device 24. When a new message arrives at a wirelessly-enabled mailbox, however, the enterprise server 602 preferably responds to the associated notification from the Exchange server 601 by executing operations to redirect the new message to the user's mobile device 24, provided that an appropriate redirection trigger has been detected. Any determinations of the type of mailbox change notification and whether or not any redirection functions are necessary are preferably made within the enterprise server 602.

Although the enterprise server 602 is shown outside the LAN 14, the enterprise server 602 may be running as a service within the LAN 14, for example, as a Windows NT® service. As such, administration functions for the enterprise server 602 may be integrated with other network service administrative arrangements. Since the enterprise server 602 operates in conjunction with the Exchange servers 601, the enterprise server administration could be integrated with Exchange server administration, for example, as an Exchange extension. When an existing user's mailbox is to be enabled for redirection of messages to a mobile device, an Exchange administrator may add the user to the enterprise server 602 through a mailbox extension. For a new user, the Exchange administrator may add the user's mailbox on an Exchange server 601 and also add the user to the enterprise server 602 during a single login session.

Figure 7:
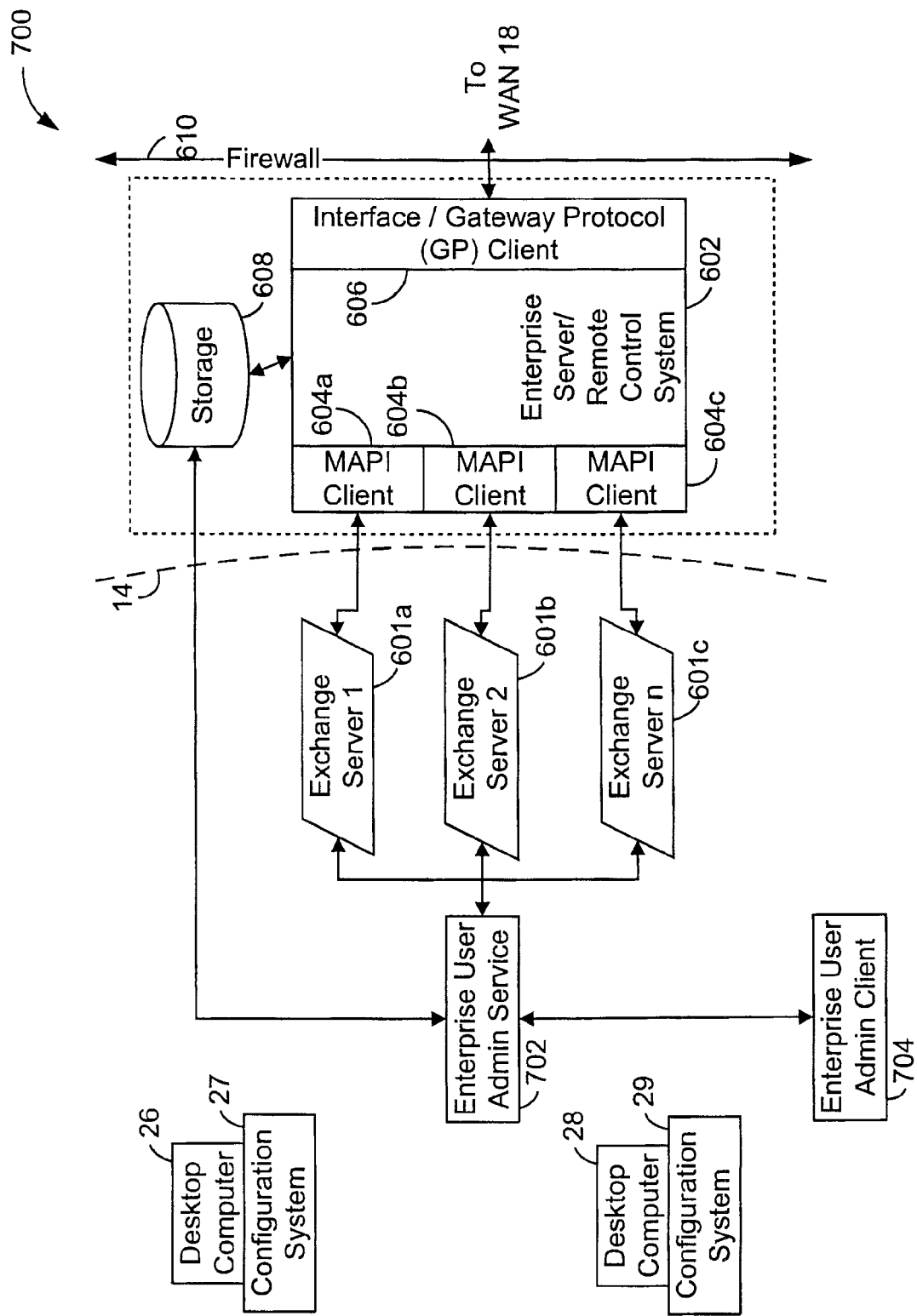
FIG. 7 is a block diagram of an exemplary user administration system.

Alternatively, administration of the enterprise server 602 may be accomplished, for example through an administration service and client arrangement such as shown in FIG. 7. In the embodiment shown in FIG. 7, a user administration service 702, preferably a software program, is installed and executed on a computer which can communicate with the Exchange servers 601 and has Exchange administration rights. Administration rights are typically associated with network accounts instead of particular computers. Therefore, provided that a computer user logs on using an account having Exchange administration rights or a computer is configured to run under a specific account having Exchange administration rights, the service 702 may be executed on that computer. When installed and started, the administration service 702 runs in the background on the computer on which it is installed. An enterprise server administration client 704 is similarly installed on a computer in the network 14 and communicates with the service to perform enterprise server administration functions, as discussed below. In alternative embodiments, the service 702 may instead run on one or more of the Exchange servers 601.

Although the service 702 should operate on a computer having Exchange administration permissions, the client 704 may be installed on any computer within the network which can communicate with the computer on which the service 702 is running Enterprise server administration features are thereby provided through the client 704 without requiring Exchange administration privileges or permissions. Administration functions for the enterprise server 602 remain integrated with Exchange administration, in that the service 702 performs enterprise server administration through Exchange administration arrangements. However, the client program 704 requires no Exchange administration permissions; only the service 702 requires such administration rights.

The client-service enterprise server administration arrangement thereby provides for flexibility in assignment of Exchange administration rights to enterprise server administrators. The service 702 is preferably configured to provide for common enterprise server administration functions, including for example, adding users to an enterprise server, deleting users from an enterprise server, listing all users on an enterprise server, and verifying that a particular user exists on a particular enterprise server. As such, only a restricted set of Exchange administration rights must be made available to enterprise server administrators through the administration client 704. Even though the service 702 may have full Exchange administration rights, it may be tailored to provide only specific enterprise server administration functions to the client 704. Therefore, after the service software 702 has been installed and is running, enterprise administration for existing Exchange users through the client 704 requires no intervention by Exchange administrators. It should be understood that further administration arrangements may be apparent to those skilled in the art, and that any of such arrangements may be implemented, according to the preferences of an owner or operator of LAN 14 and/or enterprise server 602, for administration of redirection-related functions of the enterprise server 602.

In one example, an administration function may be performed to enable an existing Exchange mailbox for redirection to a mobile device. To perform this administrative function, an "add user" administration request may be entered at the computer on which the client 704 is installed. The administration request is then sent to the service 702, which performs the actual administration function(s) required to add the user to the enterprise server 602. In order to add the user, thereby wirelessly enabling the user's mailbox, a user information record or profile should be created either on an Exchange server 601 or in the data store 608 associated with the enterprise server 602. User information, such as a user name, a mailbox name and a mobile device identifier, may be either requested from the administrator that is attempting to add the user or may be provided with an "add user" administration request or command and stored in the user information record. Once the user information record is created, data items may be redirected from the user's mailbox on a server 601 to the user's mobile device 24 by the enterprise server 602. A new mailbox may thus be wirelessly enabled as soon as the mailbox is established on a messaging server 601.

User information records or profiles for users of wirelessly enabled mailboxes are preferably stored in the data store 608 on the enterprise server 602. However, user information may instead be stored on an Exchange server 601, or at some other appropriate storage location. The user information is preferably stored in Exchange folders accessible by the enterprise server 602. Regardless of where user information records are stored, when a user is added a user information record is written to the appropriate storage location. Similarly, deleting a user from the enterprise server 602 causes a corresponding user information record to be either erased or overwritten. In order to execute such other administration functions as listing or verifying users, the enterprise server 602 accesses user information records, wherever they are stored. The user information records are also used by the enterprise server 602 to process mailbox change notifications, as discussed in more detail below.

Each mobile device 24 has a unique identification number, generally called a personal identification number or PIN, associated therewith. Adding a user to the enterprise server 602 creates a correspondence between the user's Exchange mailbox and the particular mobile device 24 to which messages addressed to the user are to be redirected. The user information record which is stored to either an Exchange server 601 or a storage unit 608 when the user is added to the enterprise server 602 therefore includes the particular PIN for the user's mobile device 24. The user information record also preferably includes the user name, mailbox name, E-mail address or other information which identifies the user or mailbox from which redirection is enabled.

In addition to user identification and PIN information stored to user records when a user is added to the enterprise server 602, an indication of the redirection status of the user's desktop system is also stored with the enterprise server user information. The status indicator should store at least the latest redirection status, such as "running" to indicate that incoming messages are currently being redirected to the user's mobile device 24, or "disabled" to indicate that message redirection is not currently active. In addition, other status information may be stored with the user information in a user information record including, for example, the name of the enterprise server 602 through which messages for the user are to be redirected, statistical information relating to the number of messages sent to or from the mobile device, the number of messages pending to the mobile device, the number of messages that have expired before being sent to the mobile device, the number of messages not sent to the mobile device in accordance with filtering rules as described below, the times that messages were last sent to or received from the mobile device, the time of last contact with the mobile device, the result of the most recent transaction involving the mobile device, and the like.

In server-based redirection schemes, a network server runs the redirection software 12B, which controls message redirection for the entire LAN 14 in which it operates. A desktop configuration system shown at 27 and 29 in FIGS. 6 and 7, associated with each desktop computer 26, 28, is also contemplated to allow users to set individual redirection properties. The desktop configuration systems 27, 29 are preferably implemented as a computer software program. With such an arrangement having both desktop and server components, users can set redirection properties or characteristics according to personal preferences even though message redirection for all users in the entire network is provided by a single server. When a user has been added to the enterprise server 602, the desktop software can be executed to establish user-configurable settings. Using the desktop software, the user can specify whether or not messages are to be redirected to the mobile device 24 when the mobile device is connected to the desktop computer, filter rules such as the above preferred sender list that determine whether or not messages should be redirected to the mobile device, the redirection triggers which initiate redirection of messages to the mobile device, and other redirection preferences. Features such as automatic backup of device information when the user connects the device to his or her desktop computer, wireless information synchronization, wireless calendar features, and possibly other redirection features may also be enabled and disabled using the desktop software component. Further configuration or setting information not directly affecting message redirection may also be specified using the desktop configuration system, including for example a signature block to be added at the end of messages sent from the mobile device, whether or not messages sent from the mobile device should be stored to a message folder on the desktop system, and how the mobile device and desktop system should be synchronized when connected.

Certain device configuration settings might also possibly be established at a desktop computer 26, 28 and transferred to a mobile device through a serial connection, for example. Device configuration settings may enable, disable or otherwise control the operation of device features, including for example, communication with other devices through the wireless gateway 20 instead of through the enterprise server 602, password and other security features, and owner information storage and/or display. It is also contemplated that certain configuration settings, such as turning a password feature on and off, setting new passwords, and specifying owner information, may be established using a mobile device. As described in further detail below, a device and possibly device settings may also be controlled from the enterprise server 602.

When a mailbox change notification is received from an Exchange server 601, the enterprise server 602 determines whether or not the notification relates to a wirelessly enabled mailbox (i.e. a mailbox that has been added to the enterprise server 602) and if redirection is currently enabled. The enterprise server 602 may search stored user information to determine if the mailbox or corresponding user exists on the enterprise server 602. If the user is not found in the user information records for the enterprise server 602, then the notification is preferably ignored by the enterprise server 602. The enterprise server 602 may also compile statistics on notifications for mailboxes that have not been added to the enterprise server 602 if desired by the network owner or administrator. Alternatively, the Exchange servers 601 and MAPI clients 604 may be adapted such that notifications are provided to the enterprise server 602 only for mailboxes that have been added to the enterprise server 602. Where user information is stored in Exchange folders on the Exchange servers 601, as described above, the Exchange servers 601 can be granted access to the user information and can thereby determine if the enterprise server 602 should be notified of a change to a particular mailbox.

If a redirection trigger occurs at the desktop system, then the trigger is detected by the enterprise server 602 as described above, and a redirection status indicator in the user information is preferably set to reflect an active redirection status for the user and corresponding mailbox. Similarly, whenever redirection is not active the redirection status indicator is set to reflect an inactive redirection state. If desired by a network owner, the enterprise server 602 may support more than one active state indicator and more than one inactive state indicators, in order to provide for different types or classes of active and inactive redirection. Different inactive status indications could be assigned to allow a user or network administrator to determine why redirection is not currently active. The current redirection status for all users on the enterprise server 602 is thereby indicated in the user information records. Provided that the mailbox corresponding to a received notification has been wirelessly enabled or exists in the enterprise server user information, the enterprise server 602 determines the user's redirection status by accessing appropriate entries in the stored user information records.

When message redirection is active for the particular user and mailbox, the enterprise server 602 applies the global filter rules to any incoming messages destined for the mailbox. Filter rules may check any fields in a message to determine if any of a variety of conditions are satisfied. The filter rules may either prevent a message from being redirected to a mobile device or cause the message to be redirected. If a particular sender has a history of flooding a corporate network with junk E-mails for example, network administrators may establish a global filter rule to prevent redirection of any messages from the particular sender to mobile devices associated with mailboxes on the network. Another global filter rule might ensure that all messages from network administrators are redirected to all mobile devices associated with mailboxes having an active redirection status. Unless a message is filtered by a global filter rule, the enterprise server 602 then applies any user-configured filter rules to the message. User filter rules, like global rules, may be "preventive" or "permissive", to respectively prevent or allow redirection of messages that satisfy the filter rule conditions. By applying the global and user filter rules in this order, the enterprise server 602 ensures that global filter rules, established by system administrators, take precedence.

Figure 8:
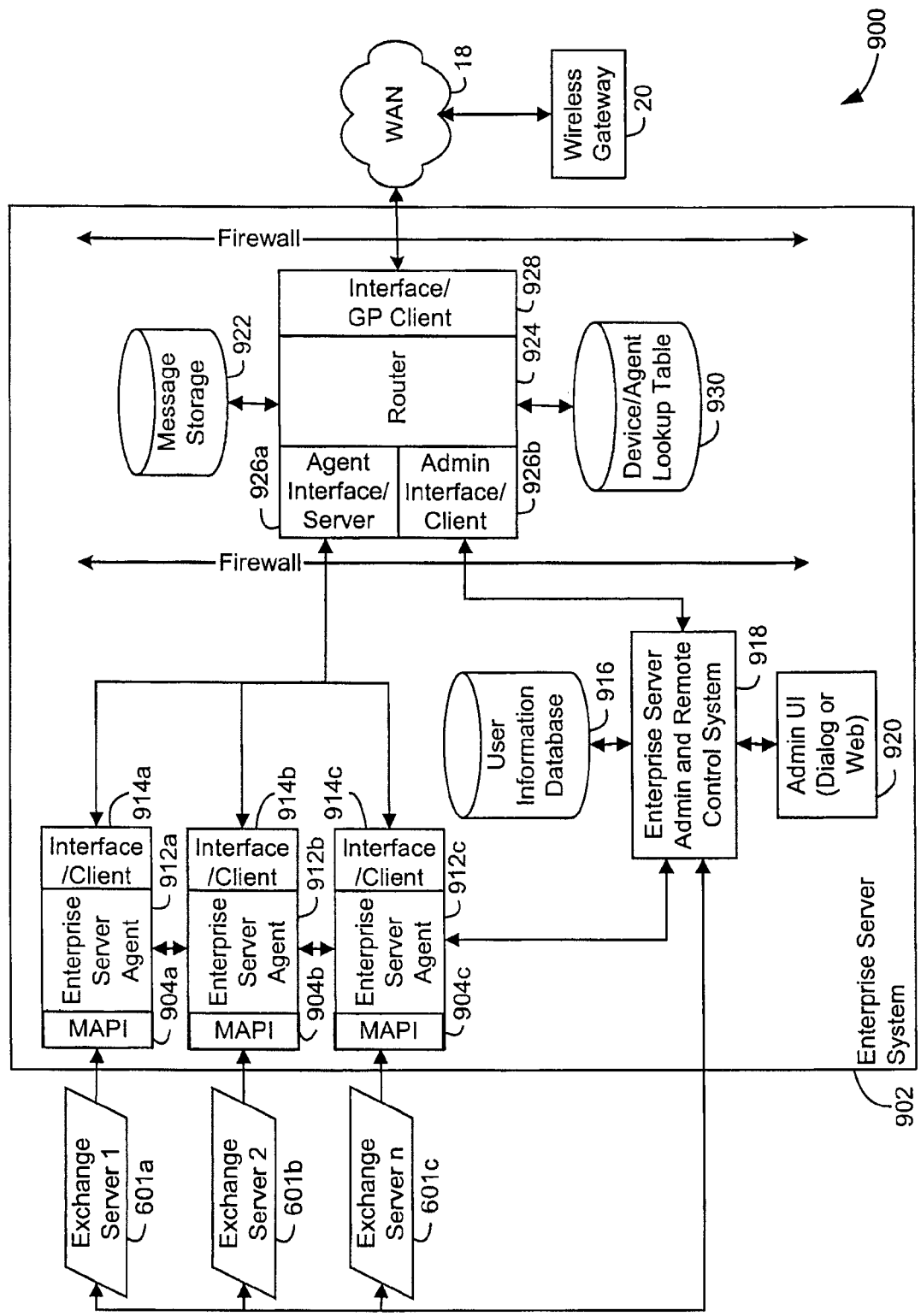
FIG. 8 is a block diagram of another exemplary network server-based distributed redirection system.

If a message passes through all of the filters, it is preferably compressed and encrypted and then forwarded to the mobile device 24, as discussed above. The message may also be copied to the storage medium 608, such that the enterprise server 602 need not access the Exchange servers 601 to complete its message redirection operations. The enterprise server 602 repackages the message into an appropriate wrapper for transmission through the interface 606 over a WAN 18, such as the Internet, to the wireless gateway 20 in accordance with a gateway protocol, which may be a public protocol or a proprietary protocol. As shown in FIG. 8, the interface 606 could be implemented as a gateway protocol client associated with a service implemented in the wireless gateway 20. The gateway 20 then transmits the redirected message through a wireless network to the destination mobile device 24.

As described above, a user information record creates a correspondence between a user's Exchange mailbox and the particular mobile device 24 to which messages addressed to the user are to be redirected, using the PIN or other device address or identifier. When a data item is to be redirected from a user's Exchange mailbox, the device PIN, address or identifier is used when the data item is repackaged into an outer wrapper for forwarding to the device, as described above. However, such device addresses or identifiers can also be used by the enterprise server 602 for direct wireless messaging when a data item generated at the enterprise server 602 is to be sent only to one or more of the devices 24. Although referred to hereinafter as "direct wireless messaging", it should be appreciated that the enterprise server 602 may use intervening communication links, such as 32 and 22, to send such messages to mobile devices 24. The intervening communication links may, for example, include wired links and equipment such as the wireless gateway 20.

In direct wireless messages, the device address or identifier of each intended recipient device 24 is used instead of the address associated with an Exchange mailbox. Unlike the redirection scheme described above, a data item is generated at the enterprise server 602, not redirected from an Exchange mailbox. Direct wireless messaging effectively bypasses E-mail server systems. As such, it is contemplated that messages or data items that are intended only for mobile devices 24, such as data items that remotely control devices 24, as described in further detail below, could be sent via direct wireless messaging.

Corporate networks are typically designed to be secure, partly to maintain confidentiality of internal messages. A message which is redirected to a mobile device should therefore also remain confidential. Thus, the enterprise server 602 first compresses a message and then encrypts the message before sending it to the gateway 20 over the WAN 18. The repackaging of such messages by the enterprise server 602 does not require message decryption. Similarly, the wireless gateway 20 forwards the message through a wireless network, repackaging the message if necessary to ensure proper routing to the mobile device 24, without performing any decryption operations. Messages are encrypted behind the network firewall 610, and therefore remain encrypted and secure until received and decrypted by a mobile device 24. This arrangement effectively extends the network firewall to the mobile devices 24. If redirected messages are also compressed at the enterprise server 602, thus decompression is performed by the mobile device 24.

To provide end-to-end security, the mobile devices 24 should be capable of decrypting redirected messages. The mobile devices 24 should also encrypt any messages sent over the wireless network to the enterprise server 602. Message security may, for example, be derived from an encryption key shared by the enterprise server 602 and the mobile device 24. The encryption key for a particular mobile device 24 may be generated by either the desktop system or the enterprise server 602 and loaded directly onto the mobile device 24 through a port connection. A mobile device 24 should, therefore, be connected to the desktop system or the enterprise server 602 in order to enable secure communications. When the key has been loaded onto a user's mobile device 24, the enterprise server 602 can use its encryption key to encrypt messages to be sent to the mobile device 24 and decrypt messages received from the mobile device. Similarly, the mobile device 24 uses its encryption key to decrypt received redirected messages and encrypt outgoing messages. It should be understood that each mobile device 24 should use a different encryption key. Therefore, the enterprise server 602, located behind the corporate firewall, should be the only device that has access to all of the encryption keys used by all of the mobile devices 24. Message encryption involves applying the encryption key to the message in accordance with a cipher algorithm. A preferred cipher algorithm is triple-DES, a known and very powerful algorithm. However, other cipher algorithms may be used instead of triple-DES.

To avoid compromising the integrity of the firewall 610, the enterprise server 602 initiates its connection to the wireless network only in an outbound direction. Unauthorized access to the network 14 from outside the firewall 610 through the enterprise server connection is thereby prevented. When a connection to the wireless gateway 20 through the WAN 18 is established, the enterprise server 602 maintains the connection, an therefore does not need to re-establish the connection every time a message or information is to be redirected to a mobile device.

Particularly in a corporate environment, a corporate client, as an owner of the mobile devices 24 operating in conjunction with an enterprise server 602 in its corporate network, may wish to exercise some controls over the use of devices 24 and redirection and other device services. Such a client may wish to control access to both the information stored on its devices and the functions supported by the devices. Although guidelines or policies for device security and use may be established, a device password or passcode requirement, for example, distribution and enforcement of such guidelines is difficult, particularly in relatively large organizations in which many devices may be deployed.

The remote control system remotely controls the operation of the mobile devices 24a and 24b which incorporate a corresponding control message processing system. This remote control functionality may be used to support administrative security features such as disabling a device to render it totally or partially inoperable to a user, resetting an existing device password, setting a new device password, locking a device such that a password must be correctly entered to use the device, or some other administrative command function. The remote control system may, for example, be a software application executing on the enterprise server 602 (as illustrated). In other embodiments, however, the remote control system may execute on the Enterprise User Administration Service 702, or on some other suitable processor in the system 600, 700. The remote control messages generated by the remote control system are transmitted by the enterprise server 602 to one or more mobile devices 24a and 24b to be controlled "over-the-air", i.e. through the WAN 18, link 32, wireless gateway 20 and link 22. It should also be appreciated that not every mobile device 24 need necessarily include a control message processing systems. Such mobile devices as 24c are not remotely controlled, and the operation of these devices is preferably not affected by transmission of control messages to remotely controllable devices such as the mobile devices 24a and 24b.

Remote control messages or data are preferably established by an enterprise server administrator with access to the remote control system on the enterprise server 602. Access to the remote control system may be provided, for example, through a user interface to the enterprise server administration system. As described above, enterprise administration may be integrated with Exchange server administration, through a client-server arrangement or possibly via some other arrangement.

Although a remote control message should be sent to each device to which controls are to be applied, a generic control information format may be used to enable the same control message to be applied to groups of devices. For example, a corporate network owner or operator may limit a group of device users to a set amount of network access during a given time period by generating a control message for the group and transmitting the control message to the members of each group at an appropriate time to prevent further network access.

The remote control system may load a list of controllable device features onto a User Interface (UI) when the system is started by an enterprise server administrator. The list of controllable features may, for example, be stored in the storage unit 608, in a data store accessible to the enterprise server 602 and/or enterprise server administration system, or in some other suitable memory location. New features may then be added to the controllable features list as remote control of such features becomes available, thereby making control feature selections in the remote control system dynamic. With this function, the administrator is able to generate control messages using an up-to-date list of remotely controllable device features. Since the remote control system is typically provided on the enterprise server 602, an administrator may also access a user list in order to select and identify the mobile devices 24 to which new control messages are to be sent.

In order to monitor control message efficiency and effectiveness, a log file may be generated to record whether the remote control messages generated by the remote control system were successfully applied to the identified mobile devices. The log file may be stored in the storage unit 608 and accessible to system administrators. This log file, along with other statistics monitored by the enterprise server 602, may be compiled for overall enterprise server operations, on a per user basis, and/or for groups of users. Information associated with particular users or devices may similarly be tracked in user-specific files or in the user information records. For example, depending upon the preferences of administrators, owners or operators of a system such as 600 or 700, a list of features for which control messages have been sent to a device, a feature for which a control message was most recently applied for a user's device, the time that a control message was last sent to a user's device, the current status (pending, error, received by device, accepted and applied on the device) of any control messages, and other control-related statistics may be stored in the user information records or user-specific log files.

When a control message has been prepared by the remote control system, it is transmitted to each identified device 24. However, the remote control system is preferably configured to schedule control message transmissions such that large traffic spikes on the communication links between the enterprise server 602 and devices 24 are avoided. Traffic bursts that could be initiated when an enterprise server 602 sends a control message to hundreds or more devices within a short time could cause significant problems, particularly in wireless communication networks. Unless a control message is urgent, control messages should be queued to allow for transmission during non-peak hours or gradual transmission to users at a manageable rate. When control messages are queued, if a new control message for a particular remotely controllable feature for a device is generated while a previous control message for that same feature and device is still pending, then the pending control message is preferably replaced with the new control message. This ensures that the most recent control is applied for the feature and avoids transmission of obsolete control messages to devices.

A control message prepared by the remote control system includes control information that is processed by one or more devices. The control information is preferably incorporated into the control message and associated with a particular content type. In other embodiments, however, the control information may be appended or attached to a control message such as an E-mail message or transmitted in some other suitable format. The enterprise server 602 may encrypt, compress and repackage control messages and then forward such messages to the mobile devices 24. Since control messages affect only the operation of the mobile devices 24 and are sent directly to mobile devices 24, copies of control messages need not necessarily be stored to a user's Exchange mailbox. However, the enterprise server 602 could be configured to store, in a user's mailbox, copies of control messages or indicators that control messages have been sent to a user's device, if system owners or administrators wish to provide control message transmission records or indications to users on their desktop computers 26, 28.

Since remote control commands affect the operation of a mobile device, command messages are preferably formatted to provide for at least authentication of senders. In this manner, a device is able to determine whether a command message is valid or whether the command specified in a particular command message should be applied. Thus, a command should only be applied when the identity of a sender has been authenticated. This authentication may be accomplished, for example, by generating and appending a digital signature to the command message. A mobile device may then authenticate the identity of the sender of a command message, as well as integrity of the content of the command message (i.e., that the message has not been changed since it was sent by the sender), by verifying the digital signature.

Received control messages may be automatically processed by the control message processing system on the device 24. The control message processing system is preferably a software routine or application executing on the mobile device 24. The control message processing system may, for example, verify digital signatures and execute specified control operations when a control message is received. When a device 24 receives a control message to completely disable the device, for example, the message is processed by the control message processing system and all data on the device is destroyed and all functionality on the device is disabled. If an acknowledgement was requested in the control message, then before the device is disabled, an acknowledgement message is sent back to the enterprise server 602 by the device 24 to indicate that the disable control message was received. The device 24 may also return an error message to the enterprise server 602 if it could not properly process the control message or execute the disable operation. In the event that an acknowledgement is requested but not received by the enterprise server 602 within a predetermined time period or an error code is received, then the enterprise server may re-send the control message until an acknowledgement is received. Such a control message may also cause a predetermined message, including owner information for example, to be displayed on a device. It is also contemplated that an enterprise server administrator may compose a text message to be included in a remote disable command message for display on the screen of a disabled device to indicate that the device was disabled, why the device was disabled, that the device should be returned to the owner, or possibly other information.

The device disable remote control feature may be particularly advantageous when a device is lost, for example. An enterprise server administrator may then disable a device and delete all stored information without having to first contact a network operator or any other service provider. This prevents an unauthorized user from using any device features or accessing any possibly sensitive information that was stored on the device. A display message as described above may also indicate that the device is lost and to whom or where it should be returned.

In some circumstances, it may also be advantageous to remotely disable particular device features without entirely disabling the device. For example, when a user exceeds an allotted volume of transmissions to or from a device within a certain time period, an enterprise server administrator may send a communications disable control message to the user's device. Such a control message is processed by a device 24 substantially as described above. Acknowledgement and/or error messages may be returned to the enterprise server 602, which may re-send the disable control message if required. Once communications functions have been disabled, other device functions may remain operable. An enterprise server administrator can thus disable communications for any device associated with the enterprise server 602 without intervention by a network operator or any other service provider. A predetermined display message or a message prepared by an enterprise server administrator may also be displayed on a device screen to indicate that device functions have been disabled and possibly other information, as described above.

When device communication functions are remotely disabled via a remote control packet from the enterprise server 602, as described above, communication subsystems on the device 12 may be disabled. The control message processing system may, for example, disable the communication subsystem by preventing any device software applications from calling, running or otherwise accessing communication software on the device 12. As such, only the device 12, not the user's account or address with the network operator or communication service provider, is inoperable. For example, the device's address in a communication network may remain intact and the device may remain activated on the network after being partially or completely disabled, but the device is unable to send and receive communications. In this manner, the device 12 may be re-enabled and all its functionality, including communications functionality, may be restored without having to reactivate the device on the network. Device communication functions may be re-enabled, for example through a wired serial connection to the user's desktop computer system 26, 28, the enterprise server 602, or its administrative systems. Once the identity and/or authority of a user or administrator attempting to re-enable a device is verified, device communication functions may be restored. A corporate enterprise is thus provided with enhanced communication device management and control.

Other device functions can similarly be selectively remotely disabled using remote control messages from the enterprise server 602, and an appropriate message may be displayed on the device. Disabled non-communication functions may be re-enabled via a desktop computer system 26, 28 or a system associated with the enterprise server 602 substantially as described above. If a device's communication functions are operable, however, disabled functions may also or instead be re-enabled through a remote control command from the enterprise server 602.

In a further embodiment, an enterprise server administrator can prepare and send to the device a reset password remote control message. Upon receiving such a control message, the current user password stored on a device is reset to a new password that is provided to the user by the enterprise server administrator. The user can then unlock the device using the new password. Thus, when a user forgets a device password, an enterprise administrator may restore the user's access to the device. The device may acknowledge the password reset or return an error message to the enterprise server 602, and the enterprise server 602 may re-send the control message if necessary.

An enterprise server administrator may similarly set a password for a device when no password has been set by a user. When a set password remote control command message, prepared and sent via the enterprise server 602, is received by a device, the password specified in the control message is set, and the device may be locked. The password must then be entered correctly to unlock and use the device. If a password already exists on the device, then an error message may be returned. This type of command may be used, for example, to ensure that all users set passwords on mobile devices which operate in conjunction with an enterprise server 602. Since the password set command fails if a password exists on a device, such a command message may be sent to all devices registered on an enterprise server 602 without affecting those users who have already set passwords.

In a similar manner, a device may be remotely locked via a remote control command. If a password exists on a device, then the device will be locked when a lock control command is received. The password must then be entered correctly to unlock the device. As with other control commands, acknowledgement or error messages may be returned by a device 24 to the enterprise server 602, and the control command may be re-sent by the enterprise server 602 if the command is not successfully executed on the device 24. If a device lock command fails because no password was set on a device, then the enterprise server 602 may send a set password command, which as described above sets a password and may also lock a device.

As described above for remote device disable control messages, password set, password reset and device lock remote control messages may also cause predetermined information or information included in the control message to be displayed on a device display screen.

Although described above primarily in conjunction with an Exchange messaging system, remote device control systems and methods according to the invention may also be implemented with further alternative messaging systems, including Lotus Domino systems, such as those described in further detail below.

In traditional messaging schemes such as those based on MAPI, a messaging session is conducted between a messaging client and a messaging server over some communication means, which as shown in FIG. 6 may involve a network connection between a client 604 and server computer 601.

FIG. 8 illustrates an alternative enterprise server architecture. In FIG. 8, functions of the enterprise server are distributed among distinct server components, each of which may be running on a dedicated computer. The distributed enterprise server system 902 comprises multiple agent sub-systems 912a-912c connected to a router sub-system 924; the agent and router sub-systems are connected to an administration sub-system 918, which may include, execute, or access the remote control system, as described above. Each of these component sub-systems is described in greater detail below.

Each agent 912 monitors mailboxes on a specific messaging server 601 and, when required, sends new messages to the user's mobile device (not shown) via the router 924 and wireless gateway 20. The agents 912 also manage incoming messages that are initiated by the mobile devices. As in the system 600, there is a one-to-one relation between the number of MAPI clients and the number of Exchange servers, although each MAPI client 904 in the distributed enterprise server system 902 is implemented in a separate agent 912, preferably on a different computer than all other MAPI clients and agents. Each agent 912 comprises a MAPI client 904 and a router interface, which may be implemented as an internal protocol client 914, as shown in FIG. 7. Although there may be many agents 912 in the system 900, each agent 912 is designed to monitor mailboxes on a single Exchange server 601. The one to one relationship between Exchange servers 601 and agents 912 provides for both fault tolerance and scalability, as described below.

If a MAPI session between an Exchange server, 601 a for example, and its corresponding agent 912a fails and causes the agent 912a to block, thus any other Exchange servers 601b and 601c and agents 912b and 912c can continue to operate without failure. This provides fault tolerance with respect to messaging session failure.

The distributed enterprise server architecture shown in FIG. 8 also facilitates expansion of enterprise server capacity. When a new Exchange server 601 is added, a corresponding agent 912 is added to the enterprise server system 902 to handle the server. Thus, only one enterprise server system component, instead of an entire enterprise server, is required to accommodate new Exchange servers. In the system 600, a new enterprise server 602 may be under utilized at first, but as further Exchange servers are added, the enterprise server should saturate to capacity. With the distributed enterprise server system architecture shown in FIG. 8, the messaging server load is typically distributed between the agents 912. Intercommunication between the agents 912 also provides for load balancing among the agents 912. Messaging server load can thus be distributed among all operable agents 912. Each agent 912 may possibly run on a dedicated computer, but is preferably implemented on the same computer that is operating the corresponding Exchange server 601.

Figure 9:
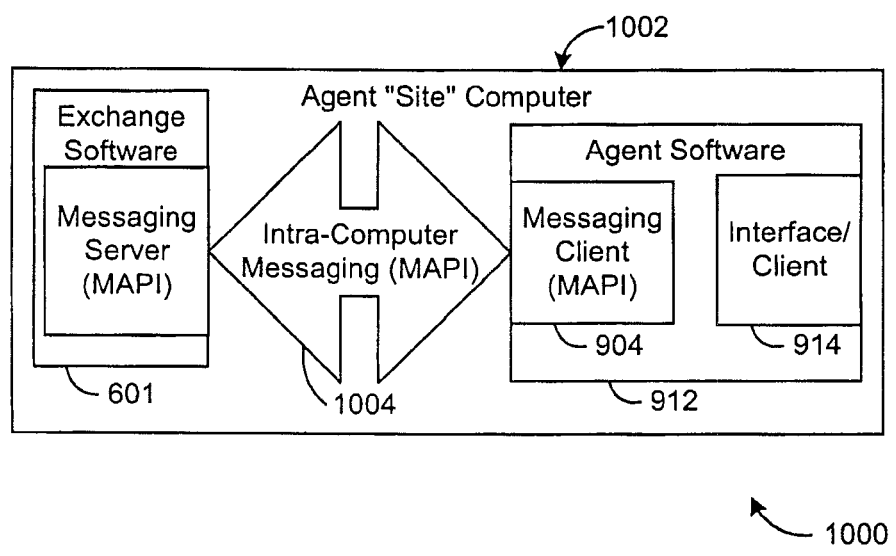
FIG. 9 is a block diagram of an exemplary agent site.

FIG. 9 is a block diagram of a "site" embodiment of an agent sub-system, wherein the same computer is used for operating the messaging server and corresponding agent. The enterprise server agent site 1000 comprises enterprise server agent software 912, which is hosted on an enterprise server agent computer sub-system 1002. The agent software 912 embodies a router interface shown as a client 914 in order to communicate with the router sub-system 924. The enterprise server agent software further comprises MAPI client software 904 communicating with Exchange server software 601 using highly reliable and readily available intra-computer communication means 1004, instead of network based communication between two computers.

In one alternative embodiment, a "site" might be provided by operating agent software on a messaging server computer instead of operating messaging server software on an agent computer as described above and shown in FIG. 9. Of these two approaches, the former is more suitable for implementation in an existing messaging system because installing agent software on an existing messaging server is simpler and more cost effective for a customer than replacing the existing messaging servers with new servers running on agent computers. For new messaging system installations, either of these approaches may be feasible.

Referring again to FIG. 8, a router protocol is used in communications between the agents 912, which may, for example, act as router protocol clients 914, and the router 924, which acts as router protocol server 926a. Like the gateway protocol described above, the router protocol may be a public or proprietary protocol, and is used as part of the process of passing data between an agent 914 and a mobile device 24 via the router 924 and wireless gateway 20.

The router 924 further comprises a wireless gateway interface 928. Similar to the router protocol interface 926a, the gateway interface 928 may also be embodied as a gateway protocol (GP) client. As described above, the gateway protocol governing communications between the enterprise server 902 and wireless gateway 20 via WAN 18 is preferably a TCP/IP-based protocol.

In the specific embodiment shown in FIG. 8, the router 924 acts as a client in order to communicate with wireless gateway 20. The router 924, as a router server, is responsible for communicating with all router clients in the system 900, and in particular with the agent sub-systems 912 and their router client software 914. The router protocol preferably provides an optional confirmation of message reception from a client or a server. The router 924 multiplexes many router protocol sessions from several agents into a single session using the gateway protocol. The router 924 also transfers messages from the agents 912 to the wireless gateway 20 via the single gateway protocol client connection to the wireless gateway 20.

The router 924 maintains a list of in-process transactions and their current state in storage, thereby providing transaction persistence. Once a message is successfully sent to the router 924 and saved to the message storage 922, it need not need to be re-sent by the agent 912. When the router 924 receives a message from a mobile device 24 through the wireless gateway 20, a lookup table 930 is accessed to determine which particular agent is handling the mobile device user's desktop system. Creation of device/agent correspondence information will be described in further detail below.

Messages destined for mobile devices 24 do not require any lookup and are passed on to the wireless gateway 20. Preferably, mobile device and agent information is extracted from outgoing messages and compared to the information in the table to ensure that the user database and the device/agent lookup table 930 remain synchronized.

The administration sub-system 918 stores administration and configuration information in a centralized data store 916. In order to administer all the routers 924 and agents 912 from one program, an administration UI 920 is provided, which may be either dialog- or web-based. The user administration of the enterprise server 902 is substantially the same as described above in relation to the enterprise server 602. The administration UI 920 acts as a client to the administration sub-system 918, which typically requires Exchange administration rights.

In the distributed enterprise server 902 however, the administration arrangement should be adapted to accommodate the various server components. For example, the distributed enterprise server administration system 918 should provide for the addition of new agents 912. In the system 600, any new MAPI clients may be integrated with the enterprise server 602. When a new agent is to be added in the distributed enterprise server system 902, however, various information records should be updated or created and stored. For any new agent 912, an identification of the router 924 to which the agent is to be connected and the machine or computer on which the agent will run, the name of the agent, the particular Exchange server 601 that the agent should monitor (typically a new Exchange server) and the network account under which the agent will run as a network service should be specified by an enterprise server administrator.

The administration system 918 assigns the router ID and an authentication key to the new agent 912 and generates an agent ID. The server domain name for the corresponding Exchange server 601 is retrieved by the administration system 918 through its interface with the particular Exchange server 601. The new agent 912 is installed on the computer specified by the administrator and appropriate registry settings are created. Then, the configuration information is updated by the router 924 to add the new agent 912. It should be understood that a more conventional scheme of administering the enterprise server 902 through the network and/or Exchange administration arrangements, although less practical, is also possible.

In the distributed architecture enterprise server system 900, a central system administration scheme is preferred. Since each agent 912 and router 924 have address, user and configuration information associated therewith, and furthermore require access to such information for other server system components, a single store for all administration information is particularly desirable. In FIG. 8, the user database 916 is the primary store for all administration and configuration information, including user administration information as described above, agent information, router information and wireless gateway information. The primary database 916 is normally accessible to all enterprise server components through the administration system 918 and appropriate interfaces. Although only one such interface 926b is shown in FIG. 8, all components requiring access to the user information database 916 should communicate with the administration sub-system 918. The administration interfaces may also be implemented as clients to one or more services of the administration sub-system 918.

This central user information storage arrangement is in contrast with the system 600, in which administration information is preferably stored on the Exchange servers 601. In order to provide some measure of backup, however, additional data stores may be provided for each agent 912 and/or the router 924. FIG. 8 shows such a separate store for the router 924 as the device/agent lookup table 930. If, for any reason, the router 924 cannot access the primary user database 916 through the administration system 918, then it may access the lookup table 930 to determine to which agent a message received from a mobile device 24 should be forwarded. Similarly, during periods when the primary data store is inaccessible, the router 924 may extract device and agent information from outgoing redirected messages and update the lookup table 930 to ensure that the lookup table is as accurate as possible.

Although the architecture of the server systems 600 and 900 are different, overall operation of the system 900 is substantially the same as described above for the system 600. When a user has been properly added to the enterprise server system 900, message notifications from the Exchange servers 601 are processed to determine whether or not a message is to be redirected. Any appropriate message filter rules are applied and when the message is to be redirected to a mobile device, the message is sent by the corresponding agent 912 to the router 924 for storage in the router message store 922 and transmission to the mobile device 24 through the wireless gateway 20.

The redirection systems described above are adapted to operate in conjunction with messaging systems using Microsoft Exchange. It should be understood, however, that redirection systems in accordance with the invention are not limited to such messaging systems. A further embodiment of the invention, as described below, provides a network server-level redirection arrangement generally similar to those described above, but adapted for operation with Lotus Domino servers. Such a redirection system is shown in FIG. 10.

Figure 10:
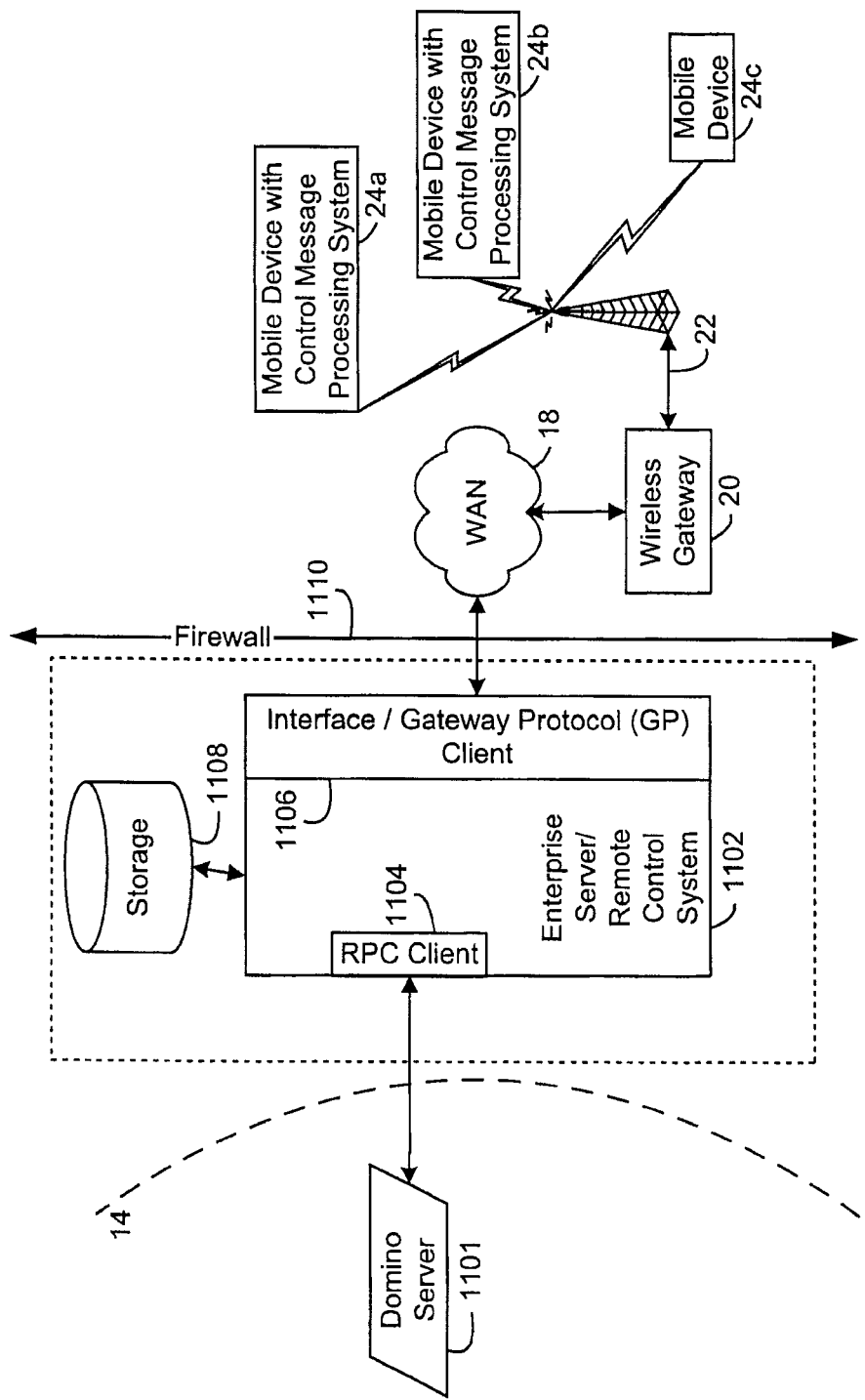
FIG. 10 is a block diagram showing another example network server-based redirection system.

The overall structure of the redirection system 1100 shown in FIG. 10 includes a messaging server 1101 in a LAN 14, an enterprise server 1102, WAN 18, a wireless gateway 20, communication links 22 including a wireless network, and mobile devices 24. The redirection system 1100 shown in FIG. 10 is similar to the redirection system shown in FIG. 6, except for differences in the messaging server 1101 and enterprise server 1102.

The redirection system 1100 in FIG. 10 represents a further embodiment of the network redirection scheme shown generally in FIG. 2. As in FIG. 6, other network components, such as servers and desktop systems, are not shown in FIG. 10. It should be understood, however, that such other network components are included in a typical network such as LAN 14. As also described above, it is assumed in FIG. 10 that E-mail is either stored at the messaging server 1101 in the network 14 or forwarded to the server 1101 when redirection is initiated.

In the system 1100, network messaging functions in the LAN 14 are provided using a Lotus Domino server 1101. A client, such as Lotus Notes, for example, enables users (not shown) in the network 14 to access their E-mail messages, calendar records, tasks and the like from the Domino server 1101. Such user clients interface with the Domino server 1101 through a Domino Remote Procedure Call ("RPC") scheme. Unlike the Exchange servers 601, the Domino server 1101 supports not only messaging or primarily E-mail clients but also other types of clients through RPC, including for example, browser clients.

In an RPC scheme, an RPC client sends a procedure call to an RPC service. The RPC service then executes the procedure and if necessary returns a result to the RPC client. In the system 1100, an RPC client 1104 on the enterprise server 1102 sends procedure calls to the Domino server 1101, which then performs the called procedures. One such procedure call would be the polling signal, in response to which the Domino server 1101 returns information relating to polled user mailboxes, as discussed in further detail below.

As shown in FIG. 10, the enterprise server 1102 includes an RPC client 1104 as an interface between the enterprise server 1102 and the Domino server 1101, and also may include the remote control message or data generation system, as described above. Through this RPC client 1104, the enterprise server 1102 accesses information stored on the Domino server 1101, thereby enabling redirection of selected information, such as a user's E-mail messages, from the Domino server 1101 to the user's mobile device 24. As in the Exchange system described above, the network 14 may include multiple Domino servers (not shown) in addition to Domino server 1101. In such systems, either multiple enterprise servers are installed to share message redirection load, or multiple RPC clients are implemented in a single enterprise server 1102. Each enterprise server in a multiple enterprise server installation would preferably be configured to manage messaging traffic for a distinct group of users, normally all users on a single associated Domino server. However, the implementation of multiple RPC clients in each of the enterprise servers would provide for more balanced and dynamic load sharing by allowing any enterprise server to communicate with any Domino server in the network. The operation of system 1100 will be described below for the single Domino server 1101. Operation of a multiple Domino server and multiple enterprise server system will be apparent therefrom.

Unlike the Exchange server redirection systems described above, the enterprise server 1102 does not rely on mailbox change notifications from the Domino server 1101. Instead, the enterprise server 1102 must poll the Domino server 1101 for new E-mail messages or other data items for redirection. A polling interval or amount of time between consecutive polls of the Domino server 1101 by the enterprise server 1102 is preferably configured when a user is added to the enterprise server 1102, which effectively enables the user for wireless redirection of information. Although the polling interval is configurable to suit the particular network 14 in which Domino server 1101 is operating, a default or recommended polling interval is preferably 20 seconds. Setting a shorter polling interval potentially provides for a shorter latency time between the arrival of a new message at the Domino server 1101 and its detection by the enterprise server 1102, which thereby provides for shorter delay between the arrival of the message and its redirection to a mobile device 24. However, a shorter polling interval requires more frequent polling and response signaling between the Domino server 1101 and the enterprise server 1102 and increases the time and processing resources that the Domino server 1101 must dedicate to polling-related functions. Because a Domino server may support many additional messaging and non-messaging functions, the increased time and resource allocations for short-interval polling may be further undesirable. A longer polling interval reduces the amount of signaling and related Domino server processing, but may increase the delay between message arrival at the Domino server 1101 and redirection of the message by the enterprise server 1102 to a mobile device 24. Selection of a polling interval thereby involves a trade-off between signaling and processing constraints and responsiveness or latency between message arrival and redirection.

Different polling intervals may be set for specific users or a single polling interval may be set for all users on an enterprise server 1102. A combined polling interval scheme may also be used in which particular users or a groups of users, network administrators for example, are configured for shorter polling intervals, whereas a longer polling interval is set for other users. Such a multiple-interval scheme provides flexibility within a single installation, effectively allowing different redirection service levels. Users requiring substantially real-time message redirection could be assigned a shorter polling interval instead of a normal or default polling interval.

The enterprise server 1102 is preferably integrated with the Domino server 1101 and in such a system would therefore operate within the network 14. The Domino server 1101 is typically implemented as a network function or service, for example, running as a network service in Windows NT. It should be understood, however, that Domino servers 1101 may instead be implemented on other platforms. Regardless of the network platform upon which the Domino server 1101 is running, the interfaces between user workstations (not shown) in the LAN 14 and the enterprise server 1102 with the Domino server 1101 are implemented with the same RPC clients. As such, redirection system components at both desktop systems and the enterprise server 1102 are platform independent.

The enterprise server 1102, through its RPC client 1104, polls the Domino server 1101 to check for new messages in all mailboxes which have been enabled for wireless message redirection. The timing of such polling is determined by the polling interval, as discussed above. A single polling signal may request Domino server mailbox information for all users currently existing on the enterprise server 1102. Alternatively, a distinct polling signal may be used to poll a mailbox for each user on the enterprise server 1102, such that the enterprise server 1102 sends a polling signal to the Domino server 1101 for each user in an enterprise server user list. The enterprise server 1102 and the polling signals it generates may instead be configurable to poll the Domino server 1101 for only certain groups of users. The polling signals and related response signals may be implemented using programming threads in enterprise server software.

In the interest of simplifying polling-related processing at the Domino server 1101 and reducing network traffic by limiting the amount of information in a response signal, a selective polling scheme may be implemented in which mailbox information is requested for only specific users. In such a polling scheme, a user mailbox is polled or included in a polling signal when redirection for the particular user is currently active. Since normal enterprise server 1102 operations typically require that the enterprise server 1102 determine whether a message or information is to be redirected to a user's mobile device 24, the selective polling feature can be provided with little or no additional processing by the enterprise server 1102. Alternatively, where the enterprise server 1102 is integrated with the Domino server 1101, a determination of whether redirection is currently active for a particular user, or analogously for which users redirection is currently active, can be made by the Domino server 1101. In such systems, when the Domino server 1101 is polled by the enterprise server 1102, the Domino server 1101 includes in its response signal information for all mailboxes for which redirection is currently active.

Depending upon the particular polling and response scheme implemented, when the enterprise server 1102 receives a response signal from the Domino server 1101, it may determine whether redirection is active for any mailboxes in which new messages have been received. In systems in which such a determination is made by the enterprise server 1102 before it polls the Domino server 1101, or by the Domino server 1101 before it generates a response to the poll, the enterprise server 1102 preferably does not repeat the redirection status determination. If redirection is not active for an existing enterprise server user when the Domino server 1101 is to be polled, then any response information provided to the enterprise server 1102 by the Domino server 1101 relating to that user would not be used for redirection functions. Such information might be used for compiling statistics or the like, but since redirection is not currently active, the enterprise server 1102 could simply ignore the response information for such users. When a new message arrives at a wirelessly-enabled mailbox for which redirection is currently active, however, the enterprise server 1102 redirects the new message to the user's mobile device 24.

In network redirection systems for Lotus Domino messaging servers, the enterprise server 1102 is preferably integrated with the messaging server 1101. This integration may possibly be accomplished by implementing the enterprise server 1102 as a task running on the Domino server 1101. Administration functions for the enterprise server 1102 in such systems may then be integrated with Domino server administrative arrangements. When a user's existing mailbox is to be enabled for redirection, a Domino server administrator adds the user to the enterprise server 1102 using an enterprise server administration utility installed on a computer from which Domino server administration functions can be performed. For a new user, the Domino server administrator may add the user's mailbox on the Domino server 1101 and also add the user to the enterprise server 1102.

As described above for the Exchange server system 600, integrated enterprise server 1102/Domino server 1101 administration also has the associated disadvantage that simply enabling an existing user's mailbox for wireless redirection of messages by adding the user to the enterprise server 1102 requires intervention by either a Domino server administrator or an enterprise server administrator with Domino server Exchange administration permission or privileges. Domino server administrators should therefore be familiar with both the Domino server 1101 and enterprise server 1102, or enterprise server administrators should have full Domino server administration permissions. As such, either Domino server administrators' workloads are increased, or control of network administration functions should be relaxed. In many networks or organizations, neither of these options would be a desirable alternative.

Figure 11:
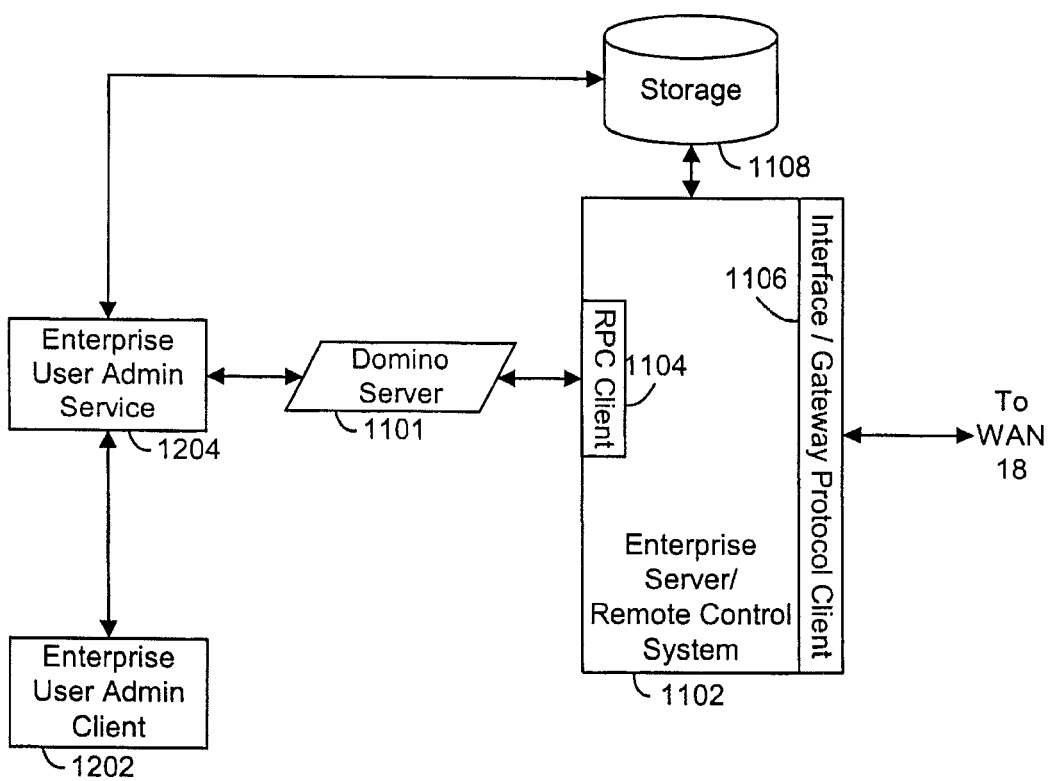
FIG. 11 shows another exemplary user administration system.

In the Domino server system 1100, enterprise server administration may be accomplished through an administration service and client arrangement. This arrangement, shown in FIG. 11, is similar to the system in FIG. 7 and operates substantially as described above. The user administration service 1204, similar to service 702, should be installed and executed in the background on the Domino server 1101 or on a computer which can communicate with the Domino server 1101 and has Domino server administration rights. The enterprise server administration client 1202 is similarly installed on a computer in the network 14 and communicates with the service to perform enterprise server administration functions.

Enterprise server user administration through the client 1202 and service 1204 proceeds substantially as described above for the client 704 and service 702 in FIG. 7, except that the client 1202 and service 1204 are preferably implemented using RPC. Where more than one Domino server is installed in the network, the service 1204 preferably communicates with and is able to administer all of the Domino servers.

The service 1204 should be running on a computer or under a network account having Domino server administration permissions, whereas the client 1202 may be installed on virtually any computer that can communicate with the computer on which the service 1204 is running Administration functions are thus provided through the client 1202, which does not require Domino server administration privileges or permissions, even though the administration functions for the enterprise server 1102 remain integrated with Domino administration. The service 1204 performs the enterprise server administration tasks requested by the client 1202 through Domino server administration arrangements.

As in the Exchange system, the Domino system client-service enterprise server administration arrangement provides for flexibility in assignment of Domino server administration rights to enterprise server administrators. The service 1204 is preferably configured to provide for common enterprise server administration functions such as adding users to an enterprise server, deleting users from an enterprise server, listing all users on an enterprise server, and verifying that a particular user exists on a particular enterprise server. Even though the service 702 may have full Domino server administration rights, it may be configured to provide only specific enterprise server administration functions to the client 1202. After the service software 702 has been installed and is running, any selected enterprise server administration tasks may thus be made available through the client 1202 to avoid the necessity for intervention by Domino server administrators.

The enterprise server administration functions described above are also contemplated for the client-service arrangement in a Domino server messaging system. An existing Domino server mailbox is enabled for redirection to a mobile device through an add user administration process by the client 1202. Before a new user may be added on the enterprise server 1102 via the client 1202, a mailbox for the new user must first be added to the Domino server 1101. In response to an add user request from the client 1202, the service 1204 creates a user information record, either on the Domino server 1101 or in the data store 1108 associated with the enterprise server 1102, including user information such as a user name, a mailbox name and a mobile device identifier.

A "delete user" administration function may delete or overwrite a user information record to thereby effectively disable one or more Domino server mailboxes with respect to wireless redirection. Enterprise server user list and verify administrative functions may also be performed by the Domino server system client 1202 and service 1204. The user records that are accessed are stored on either the Domino server 1101 or the enterprise server data store 1108.

The "add user," "delete user," "list users" and "verify user" administration functions are common enterprise server administration functions which would likely be executed relatively frequently and therefore should be performed through a client 1202 and service 1204. However, these particular functions are for illustrative purposes only. Further or different enterprise server user administration functions could be performed through a client-service or other type of enterprise server administration arrangement.

As in the Exchange system above, the client component 1202 of the enterprise server administration arrangement in a Domino server system can be installed and run on any computer in the network that can communicate with a computer that is running the service component 1204. The service 1204 should only be executed by a user with Domino server administration rights or on a computer running under an account with Domino server administration rights. The client component 1202 requires no such administration rights and thus can be either made accessible to any users or restricted to any particular users or enterprise server administrators. Restricted client arrangements maintain more control over enterprise server administration, whereas unrestricted user access to the client 1202 or at least specific client functions provides for remote administration of an enterprise server. For example, the client 1202 could be installed at a desktop computer in the network from which messages are to be redirected. Every user could then run the client program to perform some or all of the supported enterprise server administration functions. An add user or other administration procedure could also be executed automatically, the first time a user connects a mobile device to the desktop system for example.

The client 1202 may be implemented as a command line utility. Administration functions supported by the client are then invoked by entering a command according to a predetermined syntax. For multiple-user administration functions, a list of users or a filename for a file containing such a list could be specified in the command. A web-based interface, GUI or automated scripts may also possibly be used to implement the client 1202.

The function of adding a user to the enterprise server 1102 effectively enables the user's mailbox for redirection. Similarly, deleting a user from the enterprise server 1102 disables message redirection. As described above, each mobile device 24 has a unique PIN, which is associated with a user's mailbox when the user is added to the enterprise server 1102. The user information stored when the user is added to the enterprise server 1102 therefore includes the particular PIN for the user's mobile device 24 and possibly the user name, mailbox name, E-mail address or other information which identifies the user or mailbox from which redirection is enabled.

The enterprise server 1102 also preferably stores an indication of the current redirection status of the user's mailbox. This status indicator may be substantially as described above for an Exchange messaging system user, including at least the latest redirection status, i.e. "running" or "disabled", and such other status information as for example the name of the enterprise server 1102 through which messages for the user are redirected, statistical information relating to the number of messages sent to or from the mobile device, the number of messages pending to the mobile device, the number of messages that have expired before being sent to the mobile device, the number of messages not sent to the mobile device in accordance with filtering rules as described below, the times that messages were last sent to or received from the mobile device, the time of last contact with the mobile device, the result of the most recent transaction involving the mobile device, and the like.

As in the Exchange server redirection systems described above, redirection software 12B runs on an enterprise server and controls message redirection for the entire network 14, while a desktop software component allows users to set individual redirection properties according to personal preferences. When a user has been added to the enterprise server 1102, the desktop software is executed to establish user settings, such as whether or not messages are to be redirected to the mobile device 24 when the mobile device is connected to the desktop computer, filter rules such as the above preferred sender list, redirection triggers, and other redirection preferences. Further messaging settings not directly affecting message redirection may also be specified using the desktop software, including for example a signature block to be added at the end of messages sent from the mobile device, whether or not messages sent from the mobile device should be stored to a message folder on the desktop system, and how the mobile device and desktop system should be synchronized when connected. User settings, particularly redirection settings, are preferably stored with the user information in a storage location accessible to the enterprise server 1102. Although global or common redirection properties may take precedence over user settings, the enterprise server 1102 controls redirection in accordance with the user settings whenever appropriate.

Although the system 1100 is adapted for operation in conjunction with a Lotus Domino messaging system, operation of the enterprise server 1102 is substantially similar to that of the enterprise server 602 described above. When a redirection trigger occurs at the desktop system, or in the network 14 in the case of a network trigger event, the enterprise server 1102 detects the trigger and sets the redirection status indicator to reflect an active redirection status for the user and corresponding mailbox. Similarly, whenever message redirection is to be stopped, in response to a control message or connection of the mobile device to the desktop system for example, the redirection status indicator is set to reflect an inactive redirection state. The enterprise server 1102 can thereby determine the user's redirection status by accessing appropriate entries in the stored user information records. The enterprise server 1102 may support more than one active state indicator and more than one inactive state indicator, in order to provide for different types or classes of active and inactive redirection. For example, different inactive status indications could be assigned to allow a user or network administrator to determine why redirection is not currently active.

When the enterprise server 1102 determines a new message has arrived at a mailbox and that redirection is active for the particular user and mailbox, global filter rules are applied to the received message. The filter rules may check any fields in a message to determine if any or all of a variety of conditions are satisfied. As in the Exchange redirection system, these filter rules may either prevent a message from being redirected to a mobile device or cause the message to be redirected. Network administrators may establish a global filter rule to prevent redirection of virus messages for example. Another global filter rule might ensure that all messages from network administrators are redirected to all mobile devices associated with mailboxes having an active redirection status, regardless of any other filter rules, such as user filter rules. If the message passes through global filter rules, the enterprise server 1102 then applies any user-configured filter rules to the message. Thus, global filter rules, established by system administrators, take precedence.

If a message passes through all of the filters, it is preferably compressed and encrypted and then repackaged and forwarded to the mobile device 24 as discussed above. The message, or a part of the message, may also be copied to the storage medium 1108, such that the enterprise server 1102 need not access the messaging server 1101 to complete its message redirection operations. For example, only the first 2 kilobytes (2 k) of any long message may be copied to the data store 1108 and forwarded to the mobile device 24. The remainder of such messages may then be requested by the user of the mobile device 24, and the enterprise server 1102 accesses the remainder of the message on the Domino server 1101 and forwards further 2 k blocks for example, to the mobile device 24.

The enterprise server 1102 repackages the compressed and encrypted message into an appropriate wrapper for transmission through the interface 1106 over WAN 18 to the wireless gateway 20 in accordance with a gateway protocol. The interface 1106 could be implemented as a gateway protocol client associated with a service implemented in the wireless gateway 20. The gateway protocol in FIG. 10 is preferably the same protocol described above in conjunction with FIGS. 6 and 8. Even though the enterprise server 1102 operates with a Lotus Domino messaging system instead of the above Exchange system, the connections between the enterprise servers 602, 902, 1102 and the wireless gateway 20 preferably conform to the same gateway protocol. This common protocol allows a single wireless gateway 20 to provide routing of redirected information or data items to mobile devices 24 from different enterprise servers, each of which may be operating with different messaging server systems, which in turn may be implemented on any of a plurality of network platforms.

As described above, the enterprise server 1102 provides end-to-end security for information redirected from the network 14 to mobile devices 24. The enterprise server 1102 preferably compresses messages to be redirected, encrypts the messages using a unique encryption key shared with the destination mobile device 24 and a cipher algorithm such as triple-DES, and sends the message through the WAN 18 and the wireless gateway 20 to the mobile device 24. Encrypted messages are decrypted only at the destination mobile device 24. Not even the service provider operating the wireless gateway has access to a clear version of encrypted redirected messages or information. Messages sent from mobile devices 24 are similarly decrypted only at the enterprise server 1102, decompressed if necessary, and then forwarded to the Domino server 1101. If the addressee or recipient is within the network 14, the message is delivered directly to the recipient's mailbox. Where a recipient is outside the network 14, the message is forwarded by the Domino server 1101 through a further server (not shown) such as an SMTP server in the network 14.

The integrity of the firewall 1110 and thus the protection of the network 14 from unauthorized access is maintained in the system 1100 by initiation of the connection of the enterprise server 1102 to the WAN 18 and wireless gateway 20 in an outbound direction. As in the Exchange redirection systems described above, this connection between the enterprise server 1102 and the wireless gateway 20 is kept open, such that mobile devices 24 in a Lotus Domino redirection system such as shown in FIG. 10 remain "always on, always connected".

As described briefly above, redirection functionality for a network with multiple Domino servers such as 1101 could be enabled by a single enterprise server such as 1102 having multiple RPC clients, one client per Domino server. However, the RPC clients and the single enterprise server 1102 in such a system would be prone to enterprise server blocking. An interruption in communication between any one RPC client and an associated Domino server may potentially cause the enterprise server 1102 to block, thereby affecting all other RPC clients on the enterprise server 1102 and halting all redirection operations. In addition, a single enterprise server 1102 may accommodate many users, but has some maximum capacity which limits the number of RPC clients that may be implemented. If network requirements approach this capacity, in a very large corporate network for example, quality and reliability of service tend to decline.

Both these problems may be alleviated to some degree by providing more than one enterprise server for a network. Such a solution would likely be feasible to provide required additional capacity, although the substantially higher costs relative to simply adding further RPC clients each time an additional Domino server is installed might not be justifiable when blocking is the primary concern. Furthermore, networks having multiple enterprise servers require multiple connections through the corporate firewall over WAN 18, and thus further complicate network topology. Such multiple enterprise server systems may also necessitate user transfers between enterprise servers when a user changes work locations in a corporate network, such that new routing information must be obtained. Central administration of systems with multiple enterprise servers presents a further challenge.

Figure 12:
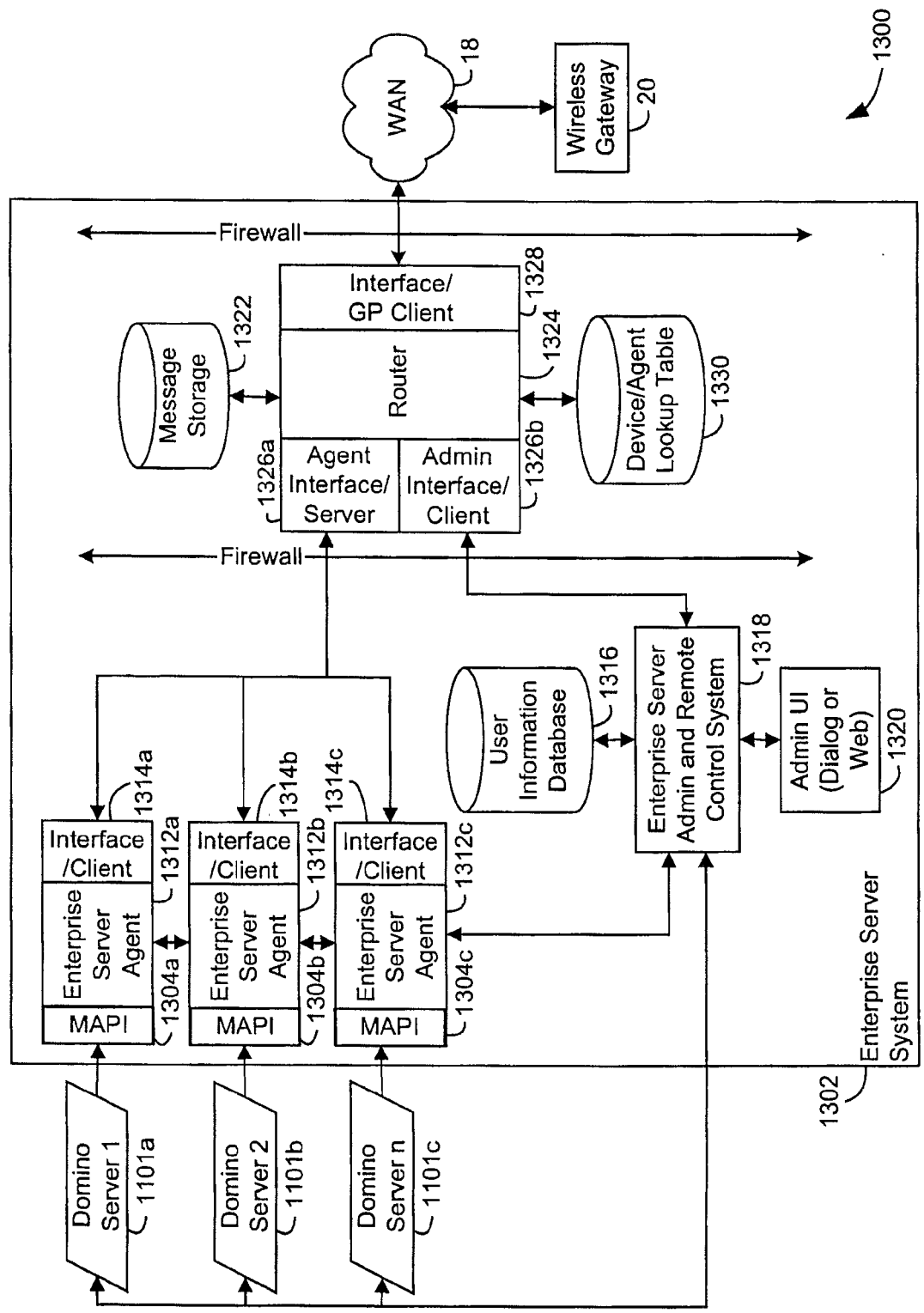
FIG. 12 is a block diagram of yet another network server-based distributed redirection system.

The Domino system, like the Exchange system above, is also suited to implementation as a distributed architecture as shown in FIG. 12. The Domino system 1300 in FIG. 12 is similar to the Exchange system 900 in FIG. 8, in that functions of the enterprise server are distributed among distinct server components, each of which may be running on a dedicated computer. The distributed enterprise server system 1302 has agent sub-systems 1312a-1312c connected to a router sub-system 1324, and an administration sub-system 1318 connected to both the agent and router sub-systems.

Each of the sub-systems in FIG. 12 has been described in detail above in conjunction with FIG. 8. Although the enterprise server system 1302 is adapted for operation with Domino servers 1101 instead of the Exchange servers 601 in FIG. 8, the various sub-systems in the enterprise server system 1302 operate substantially as described above. The Domino servers 1101a,b,c and all associated interfaces, including the clients 1304a, b, c and the interfaces to the administration sub-system 1318, are preferably based on RPC instead of MAPI (for the Exchange system), but the enterprise server system 1302 is otherwise virtually the same as the enterprise server system 902.

Each agent 1312, as described in detail above, monitors mailboxes on a specific Domino server 1301 and sends new messages to associated mobile devices (not shown) via the router 1324 and wireless gateway 20, and also manages incoming messages sent from the mobile devices. In the Domino enterprise server system 1302, the mailbox monitoring is accomplished by polling the Domino servers 1101. An agent 1312, running on a computer on which no other agents are installed, is preferably implemented for each Domino server 1101 and is preferably designed to monitor mailboxes on a single Domino server 1301.

The one to one relationship between Domino servers 1301 and agents 1312 provides for both fault tolerance and scalability. If communications between an RPC client, 1304a for example, and its corresponding agent 1312a fails and causes the agent 1312a to block, any other Domino servers 1301b and 1301c and agents 1312b and 1312c can continue to operate. The distributed enterprise server system 1302 also facilitates expansion of enterprise server capacity, as described above. When a new Domino server 1301 is added, only a corresponding agent 1312 must be added to the enterprise server system 1302. Thus only one server system component, not an entire enterprise server, is required to accommodate new Domino servers. As described above, each agent 1312 may be integrated with the Domino server to form a site, similar to the site shown in FIG. 9. In a Domino server system however, internal site communications between the Domino server and the agent would be through RPC, with an RPC client and server, instead of MAPI.

Each agent 1312 comprises an RPC client 1304 and a router interface which, as in the system 900, may be implemented as an internal protocol client 1314. This internal protocol is preferably the same, regardless of the type of messaging servers with which an enterprise server operates. Similarly, the gateway protocol (GP) governing communications between the enterprise server 1302 and wireless gateway 20 via WAN 18 is preferably common to all enterprise server implementations and therefore is also messaging server- and platform-independent. In a preferred embodiment, the router and gateway protocols are the TCP/IP-based BRP and SRP communication protocols, respectively, as described above.

The administration sub-system 1318 preferably stores administration and configuration information in a centralized data store 1316, and may execute the remote control message or data generation system, as described above. A dialog- or web-based administration UI 1320 provides for central administration of all the routers 1324 and agents 1312 from one program. Actual user administration of enterprise server 1302 is substantially the same as described above, in that the administration UI 1320 acts as a client to the administration sub-system 1318, which requires Domino server administration rights.

In the distributed enterprise server system 1302 however, the administration sub-system 1318 should also be adapted to accommodate the various server system components. For example, the administration sub-system 1318 should provide for addition of new agents 1312. When a new agent 1312 is to be added, various information records, which include at least an identification of the router 1324 to which the agent is to be connected and the machine or computer on which the agent will run, the name of the agent, the particular Domino server 1301 that the agent monitors and the network account under which the agent will run as a network service, must be updated or created and stored.

The administration system 1318 assigns the router ID and an authentication key to the new agent 1312 and generates an agent ID. The server domain name for the corresponding Domino server 1301 is then retrieved by the administration system 1318 through its interface, preferably using Domino RPC, with the particular Domino server 1301. The new agent 1312 will then be installed on the computer specified by the administrator and appropriate registry settings will be created. The final step in adding a new agent 1312 is updating configuration information used by the router 1324. A more conventional scheme of administering the enterprise server 1302 through the network and/or Domino server administration arrangements, although less practical for the distributed system 1300, is also possible.

In the distributed architecture enterprise server system 1300, a central system administration scheme is preferred, as described above. A single database in a storage device 1316 can then be used to store all administration information. All administration and configuration information, including user administration information as described above, agent information, router information and wireless gateway information is thereby made accessible to all enterprise server components from a single location, through the administration system 1318 and appropriate interfaces. Although only one such interface 1326b is shown in FIG. 12, all components requiring access to the user information database 1316 should communicate with the administration sub-system 1318. The protocol used for internal enterprise server interfaces between the administration sub-system 1318 and the agents 1312 and router 1324, like the router protocol and the gateway protocol, is preferably messaging server- and platform-independent. The interface between the enterprise server administration sub-system 918 and the Domino servers 1101 is therefore the only server-dependent administration interface.

At least some of the administration information is preferably also stored in additional separate data stores provided for each enterprise server sub-system. The lookup table 1330 is one such separate store for the router 1324 and allows the router 1324 to determine to which agent a message received from a mobile device 24 should be forwarded, if for any reason the router 1324 cannot access the primary user database 1316 through the administration system 1318. In any such time periods during which the primary data store 1316 is inaccessible, the router 1324 preferably extract device and agent information from outgoing redirected messages to update the lookup table 1330. Similar arrangements could be implemented for backup data stores (not shown) for the agents 1312.

Overall operation of the system 1300 is substantially the same as described above. When a user has been properly added to the enterprise server system 1302, polling response signals from the Domino servers 1301 are processed to determine whether or not a new message is to be redirected. All applicable global and user filter rules are applied and, if appropriate based on the filter rules, the message or at least a portion thereof is sent by the corresponding agent 1312 to the router 1324. The router 1324 then stores the message, or a portion such as the first 2 k of the message, in the router message store 1322. The entire stored message or portion of the message is then compressed, possibly encrypted, repackaged, and then transmission to the mobile device 24 through the wireless gateway 20.

The versatility of enterprise server systems as described herein will be particularly apparent from a comparison between the distributed systems 900 and 1300. As described above, the agents 912/1312 should be adapted to monitor and communicate with the particular messaging system in the network 14. Agent operations and all other agent interfaces are common for all messaging systems. Inter-agent communication interfaces, agent to router interfaces, and agent to administration sub-system interfaces are preferably independent of the network messaging system. The administration sub-system is also substantially independent of the messaging system, except for its interface with the messaging servers and perhaps administration command and information formats. At the router 924/1324, communications with the agents and with the administration sub-system are preferably messaging system independent except with respect to information formats, for example, and the gateway protocol is also independent of the network messaging system. Thus, the basic enterprise server system including agents, an administration sub-system and a router sub-system can therefore be adapted provide data item or message redirection for networks using messaging systems other than Microsoft Exchange and Lotus Domino. In a similar manner, the systems 600 and 1100 are also adaptable for further messaging systems.

The embodiments described herein are examples of structures, systems or methods having elements corresponding to the elements of the invention recited in the claims. This written description may enable those skilled in the art to make and use embodiments having alternative elements that likewise correspond to the elements of the invention recited in the claims. The intended scope of the invention thus includes other structures, systems or methods that do not differ from the literal language of the claims, and further includes other structures, systems or methods with insubstantial differences form the literal language of the claims.

Figure 13:
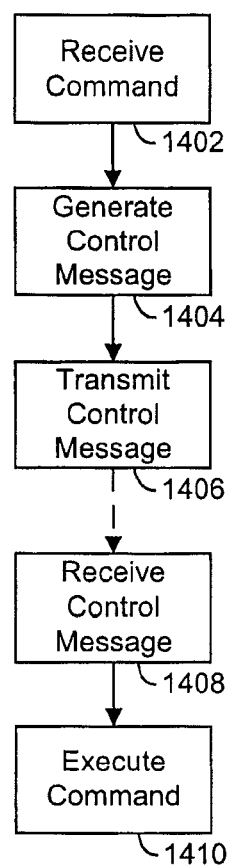
FIG. 13 is a flow chart showing a method of controlling operation of a mobile data communication device.

For example, although described above primarily in the context of a system, remote control of a mobile device according to aspects of the invention also embodies methods. FIG. 13 is a flow chart showing a method of controlling operation of a mobile data communication device. As described above, such a mobile device is configured to perform a plurality of operations. The method begins with a step of receiving a command, from an administration system, for example, that identifies at least one operation of the mobile communication device, as shown at 1402. A control message corresponding to the command is then generated at step 1404 and transmitted to the mobile device through a wireless network at step 1406. When the control message is received at the mobile device at step 1408, after some time delay associated with the wireless network and possibly a control message queue arrangement, the control message is processed and the command is automatically executed on the mobile device at step 1410, to cause the mobile device to perform the identified operation.

In addition, redirection functionality may be provided not only for messages in a network, but also for other data items, including but not limited to tasks or task lists, calendar events such as appointments and appointment requests, address book or contact information and similar data items relating to common messaging system features. Particularly in networks using Domino servers, many non-messaging data items could also be redirected. Messaging is but one feature supported by Domino servers. Any documents, databases, information downloaded by Domino server browser clients and the like may also be redirected to a user's mobile device.

Furthermore, the use of common internal enterprise server system protocols facilitates migration of enterprise server features for any particular network messaging system or platform to any other network messaging system or platform.

The invention claimed is:

1. A system for controlling the operation of a mobile wireless communication device, comprising:
one or more processors;
one or more memory devices; and
a redirector enabling an exchange mailbox for redirection to a mobile device so that data items may be redirected from the user's mailbox to a mobile device; and
in response to receiving electronic messaging data:
repackage the messaging data into an electronic messaging data email;
forward the electronic messaging data email to the mobile wireless communication device; and
store a copy of the electronic messaging data email to the corresponding exchange mailbox; and
in response to receiving a control message:
repackage the control message into a control message email;
transmit the control message email to the mobile wireless communication device, without storing a copy of the control message email to the corresponding exchange mailbox;
the control message including a disable instruction to the mobile wireless communication device that causes the mobile wireless communication device to disable a selected function; and
the transmitting being performed prior to the mobile wireless communication device initiating contact with the redirector software.

2. The system of claim 1, wherein the mobile wireless communication device is a data communication device.

3. The system of claim 1, wherein the mobile wireless communication device is a mobile telephone.

4. The system of claim 1, wherein the one or more processors and the one or more memory devices are included in a server.

5. The system of claim 1, further configured to transmit a re-enable instruction that causes the mobile wireless communication device to re-enable operation of the mobile wireless communication device.

6. The system of claim 1, wherein the mobile wireless communication device is configured to be subsequently re-enabled by receiving are enable instruction from a re-enabler through a wired connection between the mobile wireless communication device and the re-enabler.

7. The system of claim 1, wherein a log file is generated to record whether the control message has been applied to the mobile wireless communication device.

8. The system of claim 1, wherein the control message is formatted to provide for authentication on the mobile wireless communication device.

* * * * *